(12) United States Patent
Hetherington

(10) Patent No.: US 6,272,495 B1
(45) Date of Patent: Aug. 7, 2001

(54) METHOD AND APPARATUS FOR PROCESSING FREE-FORMAT DATA

(76) Inventor: Greg Hetherington, 22 Christina Place, Kareela New South Wales 2232 (AU)

( * ) Notice: Subject to any disclaimer, the term of this patent is extended or adjusted under 35 U.S.C. 154(b) by 0 days.

(21) Appl. No.: 09/117,776
(22) PCT Filed: Apr. 22, 1998
(86) PCT No.: PCT/AU98/00288
 § 371 Date: Aug. 6, 1998
 § 102(e) Date: Aug. 6, 1998
(87) PCT Pub. No.: WO98/48360
 PCT Pub. Date: Oct. 29, 1998

(30) Foreign Application Priority Data

Apr. 22, 1997 (AU) .................................................. PP0439

(51) Int. Cl.[7] .................................................. G06F 17/30
(52) U.S. Cl. .......................... 707/101; 707/4; 707/102; 707/531
(58) Field of Search ............................. 707/101, 1, 4, 707/102, 531, 541; 704/9

(56) References Cited

U.S. PATENT DOCUMENTS

| | | | | |
|---|---|---|---|---|
| 4,974,191 | * | 11/1990 | Amirghodsi et al. | 364/900 |
| 5,060,155 | * | 10/1991 | Van Zuijlen | 364/419 |
| 5,442,780 | * | 8/1995 | Takanashi et al. | 395/600 |
| 5,454,106 | * | 9/1995 | Burns et al. | 395/600 |
| 5,515,534 | * | 5/1996 | Chuah et al. | 395/600 |
| 5,526,522 | * | 6/1996 | Takeuchi | 395/700 |
| 5,826,258 | * | 10/1998 | Grupta et al. | 707/4 |
| 5,963,894 | * | 10/1999 | Richardson et al. | 704/9 |
| 5,966,686 | * | 10/1999 | Heidorn et al. | 704/9 |
| 6,151,604 | * | 11/2000 | Wlaschin et al. | 707/100 |
| 6,167,393 | * | 12/2000 | Davis, III et al. | 707/3 |

FOREIGN PATENT DOCUMENTS

| | | | |
|---|---|---|---|
| WO 95/35547 | 12/1995 | (WO) | G06F/59/00 |
| WO 96/34348 | 10/1996 | (WO) | G06F/17/22 |
| WO 96/35183 | 11/1996 | (WO) | G06F/17/21 |

* cited by examiner

Primary Examiner—Hosain T. Alam
Assistant Examiner—Ella Colbert
(74) Attorney, Agent, or Firm—Davis & Bujold, P.L.L.C.

(57) ABSTRACT

A method and apparatus for processing free-format data (301) to produce a "text object" associated with the free-format data. The text object comprises a plurality of "component nodes" (302–312) containing attribute-type identifiers for elements of the free-format text and other data facilitating access to the text object to obtain information and/or change or add the free-format data. This arrangement obviates the need for the provision of separate database fields for each element of the information. Free-format data can therefore be processed in a similar manner to the way a human being processes free-format data. All elements can be accessed via the constructed text object.

39 Claims, 20 Drawing Sheets

| 201 | 76 Box Rd Townsville QLD |
| --- | --- |
| 202 | PO Box 92 Geelong VIC |
| 203 | 39 Main St Box Hill VIC |
| 204 | 8 Box Ave Devonport TAS |
| 205 | Cnr Box and Wolger Rds Townsville QLD |
| 206 | 76 Box St Townsville NSW |
| 207 | 231 Box Road Townsville QLD |
| 208 | 53 3rd Ave, Townsville 4321 QLD |
| 209 | 35 Third Avenue, Townsville Queensland 4321 |
| 210 | 333 Mt Pleasant Road, Springvale |
| 211 | 191 Springvale Road, Mt Pleasant |
| 212 | 123 Sydney Ave, Melbourne VIC |

Figure 2

Address

Address 1
Address 2
Address 3
Address 4
Address 5

Address 1
Address 2
Suburb
State
Postcode

Unit #    House #
Street Name
Town
State
Postcode

Figure 4

Standard Japanese Katakana Transliteration

| a ア | i イ | u ウ | e エ | o オ |
|---|---|---|---|---|
| ka カ | ki キ | ku ク | ke ケ | ko コ |
| sa サ | si | su ス | se セ | so |
| ta | ti チ | tu | te | to ト |
| na ナ | ni | nu ヌ | ne | no ノ |
| ha | hi ヒ | hu フ | he ヘ | ho |
| ma マ | mi | mu ム | me メ | mo モ |
| ya ヤ |  | yu ユ |  | yo ヨ |
| ra | ri | ru | re レ | ro |
| wa ワ | wi |  | we ヱ | wo ヲ |
| ga | gi | gu | ge | go |
| za | zi | zu | ze | zo |
| da | di | du | de | do |
| ba | bi | bu | be | bo |
| pa | pi | pu | pe | po |
| n |  |  |  |  |

Standard Greek Transliteration

| A | α | a | I | ι | i | P | ρ | r |
|---|---|---|---|---|---|---|---|---|
| B | β | v | K | κ | k | Σ | σ | s |
| Γ | γ | g | Λ | λ | l | T | τ | t |
| Δ | δ | d | M | μ | m | Y | υ | u |
| E | ε | e | N | ν | n | Φ | φ | f |
| Z | ζ | z | Ξ | ξ | x | X | χ | ch |
| H | η | i | O | o | o | Ψ | ψ | ps |
| Θ | θ | th | Π | π | p | Ω | ω | o |

Figure 17

Sample Regular Expression Definition

|    |              | Action** | alpha | digit | symbol | space | end of line | end of string |
|----|--------------|----------|-------|-------|--------|-------|-------------|---------------|
| 0  | Error        | 0        |       |       |        |       |             |               |
| 1  | start        | 1        | 3     | 9     | 13     | 1     | 16          | 18            |
| 2  | empty        | 4        |       |       |        |       |             |               |
| 3  | Initial      | 2        | 6     | 5     | 5      | 4     | 5           | 5             |
| 4  | Initial space+ | 3      | 5     | 5     | 5      | 4     | 5           | 5             |
| 5  | Initial ^space | 5      |       |       |        |       |             |               |
| 6  | Word+        | 2        | 6     | 8     | 8      | 7     | 8           | 8             |
| 7  | Word+ space  | 3        | 8     | 8     | 8      | 7     | 8           | 8             |
| 8  | Word+ ^space | 7        |       |       |        |       |             |               |
| 9  | 0-9          | 2        | 12    | 10    | 12     | 11    | 12          | 12            |
| 10 | 0-9+         | 2        | 12    | 10    | 12     | 11    | 12          | 12            |
| 11 | 0-9+ space   | 3        | 12    | 12    | 12     | 11    | 12          | 12            |
| 12 | 0-9+ ^space  | 8        |       |       |        |       |             |               |
| 13 | sym          | 2        | 15    | 15    | 15     | 14    | 15          | 15            |
| 14 | sym space    | 3        | 15    | 15    | 15     | 14    | 15          | 15            |
| 15 | sym ^space   | 10       |       |       |        |       |             |               |
| 16 | eol+ space*  | 3        | 17    | 17    | 17     | 16    | 16          | 18            |
| 17 | eol+ ^space  | 11       |       |       |        |       |             |               |
| 18 | eoi          | 9        | 0     | 0     | 0      | 0     | 0           | 0             |

| ** Action | Action Description |
|-----------|--------------------|
| 0         | Error in Table     |
| 1         | Bypass leading spaces |
| 2         | Append this character to character buffer |
| 3         | Append trailing space to character buffer |
| 4         | Empty string       |
| 5         | Create "initial" token; go back 1 char; set state to 1 |
| 7         | Create "word" token; go back 1 char; set state to 1 |
| 8         | Create "number" token; go back 1 char; set state to 1 |
| 9         | Create "end of input" token; go back 1 char; set state to 1 |
| 10        | Create "symbol" token; go back 1 char; set state to 1 |
| 11        | Create "end of line" token; go back 1 char; set state to 1 |

Figure 18

```
Address
  -> StreetAddr, Town Zipcode State
   | PostBox, Town Zipcode State ;
StreetAddr
  -> Street
   | StreetNum Street
   | AptType AptNum StreetNum Street
   | StreetNum Street AptType AptNum ;
Street
  -> StreetName StreetType StreetDir      :-2
   | StreetName StreetType ;
StreetName
  -> word | word word ;
StreetNum -> nbr ;
AptNum -> nbr ;
StreetType                                =-4=
  -> "Ave"     | "Avenue"   ("Ave")
   | "Rd"      | "Road"     ("Rd")
   | "St"      | "Street"   ("St") ;
StreetDir
  -> Geo ;
Geo
  -> "North"  | "N" ("North")
   | "South"  | "S" ("South")
   | "East"   | "E" ("East")
   | "West"   | "W" ("West") ;
AptType                                   ==
  -> "Apt"   | "Apartment"
   | "Unit"
   | "Suite" | "Ste" ;
Zipcode
  -> 99999   | 99999 "-" 9999 ;
PostBox
  -> PostPref PostBoxNum ;
PostPref                                  =-9=
  -> "PO Box" | "Box" ;
PostBoxNum
  -> nbr | nbr A | A nbr ;
Town
  -> word | word word
   | Geo word | Geo word word ;
State
  -> "ALABAMA"     ("AL") | "AL"
   | "ALASKA"      ("AK") | "AK"
   | "ARIZONA"     ("AZ") | "AZ"
   | "ARKANSAS"    ("AR") | "AR"
   | "CALIFORNIA"  ("CA") | "CA" ;
```

Special Symbols:

| -> | Consists of |
|---|---|
| \| | Or |
| ; | Rule terminator |
| ("..") | Matching equivalence |
| =+9= | Matching Significance Adjustment |
| == | Zero Matching Significance |
| :+9 | Parsing Significance Adjustment |

Reserved Words:

| word | one or more letters |
|---|---|
| nbr | one or more digits |
| A | one letter |
| 9 | one digit |
| , | comma or nothing |

Figure 19

SQL Database Implementation Example

1. CREATE DOMAINOBJECT US_ADDRESS ;
2. UPDATE US_ADDRESS
     SET LANGUAGE = EXTERNAL 'Path/English.txt',
         GRAMMAR  = EXTERNAL 'Path/US_Addr.txt' ;

3. CREATE TEXTOBJECT ADDRESS ;
4. UPDATE US_ADDRESS
     SET DOMAIN = US_ADDRESS,
         TYPE = "Address" ;

5. CREATE TABLE PERSONS(
     Name         CHAR (20),
     Home_Addr    ADDRESS ) ;

6. INSERT INTO PERSONS ( Name, Home_Addr )
     VALUES (
       "John Smith",
       "123 Cathy Street, Apt 5, Huntsvale, CA, 98765" ) ;

7. SELECT FROM PERSONS
     WHERE Home_Addr = "Unit 5 123 Cathy St, Huntsvale, CA" ;

8. SELECT FROM PERSONS
     WHERE Home_Addr.State = "California" ;

9. SELECT FROM PERSONS
     WHERE Home_Addr.Street MATCHES "Kathie St" > 0.80 ;

New Reserved Words:

DOMAINOBJECT, TEXTOBJECT, LANGUAGE,
GRAMMAR, TYPE, MATCHES

Figure 22

METHOD AND APPARATUS FOR PROCESSING FREE-FORMAT DATA

The present invention relates generally to the processing, storage and analysis of information in the form of free-format data, and particularly, but not exclusively, to a method and apparatus for interpreting free-format text.

BACKGROUND OF THE INVENTION

One of the main purposes of computer systems is to manage information. This management of information is performed internally by data management systems. Generally, data management systems may be divided into two categories: 1) Database management systems; and 2) Text search and retrieval systems.

The first type of data management system imports and manipulates data into internal representations so that the data may be located and modified. When required, these systems generate a suitable representation of this data which is read by humans or used by another system. This category of data management system includes: hierarchical, network, relational, object-oriented database management systems and knowledge based management systems.

Within hierarchical, network and relational databases, information about an entity (a transaction, a stock item, a person, a company, an address etc.) is usually referred to as a "record" (although sometimes a record may contain information about many entities). Within each record the various "attributes" of the entity are usually classified into "fields".

Within object-oriented database management systems and knowledge based management systems these basic units may have other names such as "object" and the information regarding the object may have names such as "slot" or "member". Each of the attribute fields/slots has a format which can be, for example, integer, real number, boolean, character etc. Others are records/objects. Some fields/slots have specific formats (e.g., date, time), but yet others are free-format text.

Once the database has been constructed, it may be used to perform the following operations:

Add a record/object

Locate and change a record/object

Locate and delete a record/object

Retrieve information

These operations will be referred to as "normal database operations".

Storing of information about an entity in fields/slots is suitable for many types of data. There are however, some types of data which do not have a suitable standard structure. One best example of data which does not have a standard structure is "address" data. As most databases store people's address information in one, two or three free-format fields, performing normal database operations on individual attributes of the address is very difficult. Note that the term "attribute" is used in this specification to refer to a property of an "element" of data.

For example, the free-format data "35 Pitt Street, NORTH SYDNEY" has a number of "elements". Each element has an associated "attribute". An attribute of the element "NORTH" is that it is a "geographical indicator". An attribute of the element "12" is that it is a "number". Note that the "low level" elements correspond to the "tokens" of data i.e., the element "NORTH" is a token of the data. The data also includes higher level elements, however, e.g., "NORTH SYDNEY" is an element which includes two tokens and this element has the attribute of being a "town". An attribute of the entire data "12 Pitt Street, NORTH SYDNEY", i.e., the total "element" is that it is an "address". An alternative term for element is "component".

For each element of this free-format data to be provided with its own field for the associated attribute would increase the size and complexity of the database quite significantly, even for this simple example of addresses. Where the database includes information on people, together with their addresses, for example, in order to avoid complexity, and particularly with older databases, address data may be stored in a single field labelled "address". This field contains the address in free-format form and it is therefore not possible with present database technology to perform normal database operations on individual elements of the address—those elements cannot be accessed separately (apart from the total combination of elements which makes up the address, which can of course, be accessed as a whole, as "address").

This problem is to some extent addressed by the science of database scrubbing/cleansing. This field of commercial endeavour applies parsing processes to free-format text with the objective of creating new database fields for the attributes of the free-format text and entering into those fields completely standardised data. This standardising of data includes converting all spelling variations into one consistent set. (eg "Street"→"St".) The above example would produce the following:

| House Number | Street Name | Street Type | City |
| --- | --- | --- | --- |
| 12 | Pitt | St | Sydney |

The new database fields are then used to perform normal database operations. An entire industry is devoted to this field, applying large, complex and expensive software packages to take information stored in databases, analyse and process the information to produce new databases including more fields for the attributes of the information records, thus providing more flexibility for operations which can be applied to the records.

Much has been written about the field of database cleansing/scrubbing (see e.g., "Dealing with Dirty Data" DBMS Magazine, September, 1996). The process is expensive—a complete cleansing operation for a large database can cost millions of dollars, as it is so time consuming and the software packages that have been developed to cleanse databases are very complex—and it is still limited by the fundamental requirement that to perform database operations on an element, the element must have a field to itself.

This brings us to the second major problem which afflicts the present methods of storing computerised information in commercial databases. Practically all commercial data is stored within hierarchical, relational databases or flat data files which have a structure which is fixed at time of design, but information by its very nature is complex and can have almost an infinite number of different attributes. To create a database containing fields for each and every attribute for each and all types of different information is just not practical, if not totally impossible, and certainly the cost of any attempt to produce a database containing fields for all the types of information available to humanity would be cost prohibitive.

Even a fairly trivial (although very important) example illustrates the scale of the problem. Consider international addresses, i.e., addresses the world over. Although four or five free-format fields can contain any address, to design a database table which has a data field for every possible attribute of all international addresses would contain hundreds, if not thousands, of data fields. England has counties, USA and Australia have states, Japan has districts and different orders of addresses, etc.

The field of database cleansing/scrubbing is therefore a partial solution at best. It still requires the same fundamental database structure of a field for each data attribute. One can build more and more complex databases but this problem can never be completely resolved, and limits the computerised handling of information significantly.

Natural language processing systems are known that employ "Semantic Grammars" to encode semantic information into a syntactic grammar. These systems are mainly used to provide natural language interface to other systems such as a data base management system. The following description comes from a book by Patterson, D. W. "Artificial Intelligence and Expert Systems".

> "... They use context-free rewrite rules with non-terminal semantic constituents. The constituents are categories or metasymbols such as attribute, object, present (as in display or print), and ship, rather then NP (Noun Phase), VP (Verb Phase), N (Noun), V (Verb), and so on. ... Semantic grammars have proven to be successful in limited applications including LIFER, a data base query system distributed by the (US) Navy ... and a tutorial system named SOPHIE which is used to teach the debugging of circuit faults.
>
> Rewrite rules in these systems essentially take the forms
>
> S→What is <OUTPUT-PROPERTY> of <CIRCUIT-PART>?
> OUTPUT-PROPERTY→the <OUTPUT-PROP>
> OUTPUT-PROPERTY→<OUTPUT-PROP>
> CIRCUIT-PART→C23
> CIRCUIT-PART→D12
> OUTPUT-PROP→voltage
> OUTPUT-PROP→current
>
> In the LIFER system, there are rules to handle numerous forms of wh-queries such as
>
> What is the name of the carrier nearest to New York?
> Who commands the Kennedy?
> etc.
>
> These sentences are analysed and words matched to metasymbols contained in lexicon entries. For example, the input statement 'Print the length of the Enterprise' would fit with the LIFER top grammar rule (LTG) of the form
>
> <LTG>→<PRESENT> the <ATTRIBUTE> of <SHIP>
>
> where print matches <PRESENT>, length matches <ATTRIBUTE>, and the Enterprise matches <SHIP>. Other typical lexicon entries that can match <ATTRIBUTE> include CLASS, COMMANDER, FUEL, TYPE, BEAM, LENGTH, and so on."

These types of systems receive information in structured or free-format form and converts it to its own representations.

Although the interface is flexible the database they interface to has a fixed structure and these systems are unable to perform changes on the original (human readable) data.

Indeed there are many prior art systems which provide "Natural Language" interfaces to structured databases. All of these systems provide translation from "Natural Language" into some form of structured data and suffer from the same problems described above.

Refer to U.S. Pat. No. 4,787,035, Bourne, D. "META-INTERPRETER" and U.S. Pat. No. 5,454,106, Burns, L., Malhotra, A., "Database retrieval system using natural language for presenting understood components of ... " for examples of such systems.

As discussed earlier, one type of database management systems are knowledge based management systems (KBMS).

These systems employ the concept of attribute "slots" on an object. Slots provide or change information regarding the object either directly onto the stored values or indirectly through procedures. A simple example of "slots" will illustrate the concept: a "Square" object has two attribute slots "Length" and "Area". The "Area" slot does not need to store a value because its value can calculated by squaring the "Length" value.

Although these types of systems do not require fixed database structures, they do however, need to transform the original data into internal data representations which must be put through a very process intensive "language generation" process to produce information that is understandable by humans. If these types of systems were required to maintain the original data for use by other systems and humans, a small change would require the whole text string to regenerated.

The text search and retrieval category of data management system does not import the data but builds searchable indices which point to the original data. This category includes: document storage & retrieval systems; and Internet search engines.

These types of systems have very successful because they leave the original information in human readable form. This basic principle means that unlike the prior art database system described above, the underlying data can be very easily shared with many systems of this type. Another reason for their success is that improvements in technology can be implemented without requiring conversion of the original data. Data conversion is not only extremely expensive, but it is also a major source of data errors.

There are however, major drawbacks in using this type of system to manage data. Compared with the database systems described above. The major limitation is that the data cannot be manipulated—it cannot be modified, it must remain as it is. Other database functions which are very difficult to perform include:

Cross checking and validating the data
Integrating the data with database systems
Sorting and classifying the text data From these limitations, we can see that this category of data management system is suited to unstructured data which does not need to be changed.

In text search and retrieval systems, it is known to process a documentation collection to identify specific attributes of each document such as its "subject" topic. The types of documents which have been processed by this type of system include books, newspapers, reports, manuals and e-mail messages.

Most of these types of systems, however, only look for individual words to match and do not look at words in context. Some others identify words that are nouns but do not classify the type of noun. Both are unsuitable for data such as address data, which contains a large portion of proper nouns.

Further, the original data cannot be changed within context.

For more information regarding this area, refer to the works published by Gerald Salton.

Note that the term "text object" as used in the following description should not be confused with the terminology "text object" which has been used in systems to describe software techniques which assist in the storage and transfer of pieces of text data between computer systems by encapsulating the text string. Techniques which have used the term "text object" range from the "String" object employed within Apple Computer's operating systems (where the object contains a leading two byte "length" value and the text string) to the "Compound String" object employed by the X-Windows operating system (where the object encapsulates multiple encodings, language translations and font styles of one piece of information.)

SUMMARY OF THE INVENTION

From a first aspect the present invention provides a method of processing free-format data stored in a computing system, comprising the steps of examining elements of the data to determine attributes of the data, by examining the content of the elements and the contextual relationships of elements to each other, to determine semantic and syntactic information (attributes) about the data, producing additional data relating to this information, in the form of a text object which includes pointer means enabling access to the elements of the free-format data, and the additional data being accessible by a query processing means to provide answers to queries relating to the semantic and syntactic information about the data and/or to access the data to manipulate the data.

The term "text object" as used in the current specification does not encapsulate text string, as discussed above. The text object in the terms of the present invention provides a "semantic layer" between the actual text data and, for example, an application software system which may need to access and/or manipulate the text data.

In its simplest form, as defined above, the text object is the additional data, related to the semantic and syntactic information obtained from examination of the data elements, and a pointer means (such as a key) which can lead back to the elements of the free-format data (e.g., back to the text string which forms the free-format data).

The additional data preferably allows identification of the attributes of the data which have been obtained by the examination of the data. For example, in the "12 Pitt Street, NORTH SYDNEY" example given in the preamble, the various attributes of the data, e.g., "street" equals "12 Pitt Street"; "street number" equals "12"; "town" equals "NORTH SYDNEY", etc., are identified by the additional data and the pointer means preferably allows access to the elements of the data which are associated with those attributes. The additional data effectively provides "virtual data fields"—the data fields do not exist as they do in a normal database which would have a column field head for each attribute. Nevertheless the free-format data can be accessed on an attribute by attribute basis using the present invention, as if actual fields for those attributes did exist. The preferred embodiment of the invention thus operates to create "virtual data fields" which, preferably, allow all normal database operations on free-format text, without having to create actual database fields for the free-format text. The free-format text can remain stored as it is in the same location (usually database).

The significance of this becomes apparent when one considers the processing of many records of free-format data, for example international address data. As discussed above, although four or five address fields could store all international address data in free-format form, each data record can have many attributes, which differ from attributes of other addresses e.g., England has counties, the USA has states. To produce actual conventional database fields for all the attributes for international addresses would be an almost impossible task. However, with the present invention, each record of free-format data can be taken and processed to produce a (small) number of virtual data fields for that particular record in the form of a text object. The text object for each record can then be queried separately by an appropriate query processing means to provide all the normal database operations for that record. The data itself may stay in place. As a separate text object is created for each record, there is no problem with having different virtual data fields for each record. We do not have to create a large database with many fields, instead we leave the database records as they are and create many text objects, one for each record, to give many virtual fields overall, but few virtual fields for each text object.

The step of examining preferably includes the step of parsing the free-format data.

A text object preferably enables manipulation of the data to carry out all the normal database operations, such as changing the record, locating an element of the record, retrieving information from the record, etc. The information which may be provided by the text object preferably includes information on the elements of the data. In a preferred embodiment, the information may also include matching information (such as phonetics) to facilitate comparison of one record of data with another record of data, parsing priority information to assist in the processing of ambiguous free-format text, etc.

It is believed that this new approach will lead to computers being able to manipulate free-format data in much the same way as human beings do. There is no need disassemble the data record according to its attributes and place standardised values for each attribute type into an appropriate field in a database (as is conventional practise), once the appropriate column names for the database have been determined. Each text object for each data record provides all the processing and information the computer needs to provide all the normal database operations. The attribute types of, for example, international addresses can be compared, manipulated, etc., without it being necessary to provide a complex database with many fields.

The text object preferably includes attribute-type identifiers accessible to enable identification of attributes of the free-format data and pointer means for locating elements of the data having the particular attribute.

In a preferred embodiment, the text object comprises a plurality of parts in the form of "component nodes". Preferably, a plurality of component nodes may be associated together in a text object in a predetermined hierarchy. For example, a plurality of component nodes may be considered to be "nested" together in the form of a "text node tree" which may have a plurality of branches associating various component nodes with each other in a predetermined hierarchy. Each component node may comprise:

an attribute type identifier (for the classification of an attribute of the free-format data which is associated with that component node);

a pointer to the beginning of a sub-string within the text object's text string (i.e. beginning of the element associated with the component node).

an integer containing the character length of the element sub-string (of the data).

zero, one or more other component nodes (nested within this component node or otherwise associated with the component nodes so that the other component nodes can be accessed via the component node) preferably stored as an array;

a matching weight (to indicate the relative importance of this element when performing comparisons with other text objects);

a boolean variable indicating whether this attribute type identifier is a low level matching element; and depending on time/space considerations, one or more values to assist in the matching process. (See section on "text string operations" below for more details.)

a parsing priority value (giving a notional "priority" to the elements of the free-format data associated with the component node so that a priority may be allocated and used in the determination of the best interpretation of free-format text when ambiguities exist).

Other component nodes may not be physically nested within the component node but each component node may just contain a list of pointers to subordinate component nodes so that the subordinate component nodes can be "found" from the component node which includes the list.

Each component node preferably relates to one particular attribute of the free-format data, as identified by the attribute type identifier in the component node. Component nodes which are relatively high in hierarchy may contain or point to a plurality of other component nodes, whereas those component nodes which are the lowest in the hierarchy may not contain or point to any other component nodes as the next step down in the hierarchy is the associated element of the free-format data.

The hierarchy is determined by the parsing of the free-format data. E.g., one attribute of a record of address data may be a <Street>, e.g. "12 Pitt Street". Sub attributes of the <Street> component are <Street number> "12", <Street name> "Pitt" and <Street type> "Street". The <Street> component node will therefore list three other sub component nodes, having attribute type identifiers <Street number>, <Street name> and <Street type>.

Preferably, each component node could be considered to be text objects themselves. This recursive definition allows all the functions of the text object of the present invention to be applied to each attribute.

The text object may also comprise other data structures which assist in the quick location of specific component nodes. An example of such a structure is a lookup table containing all the attribute type identifiers and a pointer to their associated component nodes.

The query processing means is preferably a software application engine which is configured to be able to use the text object to answer questions on the data and access the data to manipulate it (e.g., correct it if it is in error).

The method preferably also includes the further step of preparing an "index" which facilitates comparison of elements of a plurality of records of free-format data. The index is preferably in the form of a table (termed by the inventors a "text object index") including columns, column headings and data, very much in the same way as a conventional database, except that it is prepared from the additional data for each of the plurality of data records.

The text object index preferably includes a table with a column for the attribute type identifier, a column for representative value keys and a column for user supplied record identifiers. The representative value key preferably provides a value representative of a feature of the element associated with the appropriate component type identifier, e.g., a phonetic value for elements which are proper nouns (e.g., Smith) or a numeric identifier for common words (e.g., Street). The section on text string matching below contains more details regarding the values of the representative key value. The user supplied record identifier will identify to the user which record of free-format data is being compared or accessed i.e., is a pointer which enables access to the record.

Where a text object index is prepared, a text object having a plurality of component nodes containing attribute-type identifiers and other data may not be necessary. All that may be required to access the data and carry out database operations is the query processing engine and the text object index. The text object index may be prepared directly from the examination of the data and the text object index includes text objects for a plurality of records (i.e., additional data plus pointer to record). The text object as a separate "component node structure" can therefore be dispensed with or is not needed in the first place as a separate entity, instead it is incorporated in the text object index as additional data plus pointers.

Where the text object includes "matching" values (or procedures to create these values) for low level matching elements of the free-format text, it is possible, for example, to compare records including elements which are in different written languages. For example, a free-format record containing a street name value in Kanji, may be compared with a street name element in Arabic by comparing respective matching values. The street name for each record could be the same street, but merely being expressed in different languages in the free-format data. The matching information provided by this aspect of the present invention therefore enables comparison of elements of free-format text expressed in different written languages.

Matching values may be generated during processing of text objects, and need not be stored in the text object. That is, they can be generated "on the fly" via procedures designated by the query processing engine. See later on in the description.

In the method of the present invention, the step of examining the elements of the data to determine the components preferably comprises the step of parsing the free-format data in accordance with grammar rules applied by a domain object. The domain object is preferably constructed by a domain construction process which uses as input data: character definition data, regular expression definition data, and grammar data.

The hierarchy of the component nodes of the text node tree is preferably determined by the grammar rules for the particular domain object.

An embodiment of the present invention may be implemented by a software application which includes a domain object and a query processing means. The domain object is arranged to examine free-format data to produce a text object which can be then used by the query processing means to enable all database operations on the free-format data. The free-format data may be stored in any conventional way, such as in a conventional database on a computer system. The free-format data may also be stored as a string in the text object. The software application comprising the domain object and query processing engine would be used to process the data without affecting its storage in the database. Other software applications could therefore interface with the database as normal, i.e., the database remains totally unaffected as far as its operation is concerned apart from the fact that the domain object and query processing means can be used to enhance the capabilities of the database by providing access to all the elements of the free-format data.

As well as allowing access to data in free-format data fields which has previously been unavailable without data cleansing and preparation of new databases with more fields, the present invention also has great potential for the future structuring and ordering of data. For example, using the present invention it may be possible to greatly reduce the number of fields which are required to store data in a database. Considering the example given above, of international name and address data, at present it is not possible for a database to deal with international address data in a single field—because international address data has many different attributes. With the present invention, however, international addresses may be kept in single free-format field containing all the international address records. Processing by the present invention provides each individual international address record with its own set of virtual data fields allowing comparison with other records via the query processing means, manipulation and access to information of all elements of each data record. Indeed, it is possible to provide a single domain object for all international addresses. Any free-format data could be processed in this way. The invention is not limited to address data.

From yet a further aspect, the present invention provides a method of enabling access to free-format data stored in a computing system, including a plurality of free-format data records, comprising the steps of storing additional data relating to semantic and syntactic information (attributes) about the data for each data record, the additional data being in the form of a text object associated with each data record, the text object including pointer means enabling access to elements of each free-format data record, the additional data being accessible by a query processing means to provide answers to queries relating to the semantic and syntactic information about the data and/or to access the data to manipulate the data.

The text object preferably includes any or all of the properties of the text object as discussed above in relation to the first aspect of the invention and the text object is preferably produced by an examination including any or all of the features as discussed above.

The present invention further provides a method of enabling access to free-format data stored in a computing system, including a plurality of free-format data records, comprising the steps of storing additional data relating to semantic and syntactic information (attributes) about the data of each data record, the additional data being in the form of a text object index which includes attribute—type identifiers for elements of each data record and pointers to each data record, the text object index being accessible by a query processing means to provide answers to queries relating to the semantic and syntactic information about the data and/or to access the data to manipulate the data.

The text object index preferably includes any or all of the properties of the text object index as discussed above in relation to the first aspect of the invention. The text object index is preferably produced by process steps as discussed above in relation to the first aspect of the invention.

From yet a further aspect, the present invention provides a processing system for processing free-format data stored in a computing system, the apparatus including means for examining elements of the data to determine attributes of the data, by examining the content of the elements and the contextual relationships of elements to each other, to determine semantic and syntactic information (attributes) about the data, means for producing additional data relating to this information, in the form of a text object which includes pointer means enabling access to the elements of the free-format data, and a query processing means which is arranged to access the additional data to provide answers to queries relating to the semantic and syntactic information about the data and/or to access the data to manipulate the data.

Preferably, the examination means and means for producing is arranged to produce a text object with any or all of the features as discussed above in relation to first aspect of the invention, by applying, preferably, the same methods of examination.

The present invention further provides a processing system for enabling access to free-format data stored in a computing system, including a plurality of free-format data records, the processing system comprising additional data relating to semantic and syntactic information (attributes) about the data for each data record, stored and accessible by the processing system, the additional data being in the form of a text object associated with each data record, the text object including pointer means enabling access to elements of each free-format data record, and a query processing means arranged to access the additional data to provide answers to queries relating to the semantic and syntactic information about the data and/or to access the data to manipulate the data.

The present invention further provides a processing system for enabling access to free-format data stored in a computing system, including a plurality of free-format data records, the processing system comprising the additional data relating to semantic and syntactic information (attributes) about the free-format data for each data record, the additional data being in the form of a text object index which includes attribute type identifiers for elements of each data record and pointers to each data record, and a query processing means arranged to access the additional data to provide answers to queries relating to the semantic and syntactic information about the data and/or to access the data to manipulate the data.

The present invention yet further provides an apparatus including a domain object arranged to process free-format data to produce a text object, the text object including any or all of the features of the text object as discussed above in relation to previous aspects of the present invention.

In a preferred embodiment, the step of accessing the text object may comprise querying one or more text objects for attributes and obtaining the value of the element corresponding to the queried attribute. For example, where the free-format data is name and address data, a person may query the text object or objects to see if there is a <Street> element, and, if so, obtain the value of the element (e.g., "12 Pitt St"). This is something that cannot be done with present databases where the "address" field merely includes all the <address> in free-format form. Other older systems provide search facilities which scan for a particular text string without regard for the semantics of the text being searched. These systems could be used to find all address with a street name of "Pitt" by searching for that string. This leads to problems when the string being searched for can be used in different ways.

"76 Box Rd Townsville QLD"

"PO Box 92 Geelong VIC"

"39 Main St Box Hill NSW"

Attempting to locate the all the address with a street name of "Box" by scan for the string "Box" will lead to many errors being generated. The present invention, in the preferred embodiment, will report only addresses contain the correct term. So, searching for street name of "Box" will return records such as:

"8 Box Ave Devonport TAS"
"76 Box Rd Townsville QLD"
"110 Box St Parramatta NSW"

Consider the address examples in FIG. 2 of the drawings, and a system user wishes to locate all the addresses on "Box Rd" within this data. If the user searches for "Box Rd", the system would return record 201, but miss records 205 and 207. If the user changes the search text to "Box", system would return all the required records, but would also erroneously return records 202, 203, 204 and 206. Even if the user specified every variation of "Road" in separate queries, the correct results would not be obtained. The problem becomes more difficult if the system user wishes to allow for errors in the data. e.g., Returning record 206 when specifying "Box Rd".

Another example where string searching without considering the semantics can lead to erroneous results is when <Street Names> have the same names as <Town Names>. For example: "123 Sydney Ave, Melbourne VIC". String searching will not allow one to find only records with "Sydney" as their town name.

The step of accessing the text object may also include comparing two text objects and ascertaining and providing a confidence value that indicates how closely the two text objects match. For example, two street addresses may be compared by comparing their respective text objects, and a confidence value (in percentage points) can be given depending on how closely they match.

The step of accessing may also include the step of changing a value associated with a particular component. Common examples include changing a woman's surname after marriage and changing the name of a street or town name after a mistake has occurred.

There are also many cases where governments change the names of street names, postcodes (e.g. Australia's Northern Territory changed their postcode range from 5800–5999 to 0800–0899), or even whole city names (e.g. Leningrad to St Petersburg).

This ability of the present invention to change a value of a particular element of the original piece of text has the benefit that the operations of legacy computer systems which use the data directly (i.e. without using text objects) will not be affected.

Yet a further aspect of the present invention provides a processing system for enabling access to free-format data processed in accordance with the method of any one of claims 1 to 19, the processing system including a query processing means arranged to access the additional data and provide answers to queries relating to the semantic and syntactic information about the data and/or to access the data to manipulate the data.

The apparatus may include means for accessing the text object in accordance with any or all of the method steps given above.

The present invention yet further provides a processing system for processing free-format data stored in a computing system, comprising means for examining elements of the data to determine attributes of the data, by examining the content of the elements and the contextual relationship of elements to each other, to determine semantic and syntactic information (attributes) about the data, and a query processing means for utilising this information to provide answers to queries relating to the semantic and syntactic information about the data and/or to access the data.

The means for examining may comprise a domain object which examines the elements and produces virtual data (being data relating to the semantic and syntactic information about the data) which is used by the query processing means to access the data and obtain information on attributes of the data.

The present invention yet further provides a method of processing free-format data stored in a computing system, comprising the steps of examining elements of the data to determine attributes of the data, by examining the content of the elements and the contextual relationships of elements to each other, to determine semantic and syntactic information (attributes) about the data, and querying the data using this information to provide answers to queries relating to the semantic and syntactic information about the data and/or to access the data.

From yet a further aspect the present invention provides a method of processing a plurality of records of free-format data stored in a computing system, comprising the steps of, for each record examining elements of the data to determine attributes of the data, by examining the content of the elements and the contextual relationships of elements to each other, to determine semantic and syntactic information (attributes) about the data, and producing virtual data fields enabling access to this information and the associated elements for each data record, whereby each record is provided with associated virtual data fields enabling access to semantic and syntactic information about that record and also access to the associated elements.

The term "virtual data fields" is used in the same sense as previously. Unlike prior art conventional databases, where it is necessary to process the information and produce actual data fields, no separate data fields need be produced. The data may remain in place where it is in the database, and instead an associated "virtual field" is produced for attributes of the semantic and syntactic information, and the virtual fields can be queried to obtain all the information required of the record, and preferably all normal database operations may be implemented.

The present invention yet further provides a processing system for processing a plurality of free-format data records stored in a computing system, comprising means for examining elements of the data of each record to determine attributes of the data, by examining the content of the elements and the contextual relationships of elements to each other, to determine semantic and syntactic information (attributes) about each record, and means for producing virtual data fields associated with each record enabling access to this information and the associated elements, whereby each record is provided with associated virtual data fields enabling access to semantic and syntactic information about that record and also access to the associated elements.

DESCRIPTION OF PREFERRED EMBODIMENT

Features and advantages of the present invention will become apparent from the following description of an embodiment thereof, by way of example only, with reference to the accompanying drawings, in which:

FIG. 2 illustrates sample "address" data;

FIG. 4 illustrates sample "address" formats;

Figure 9:
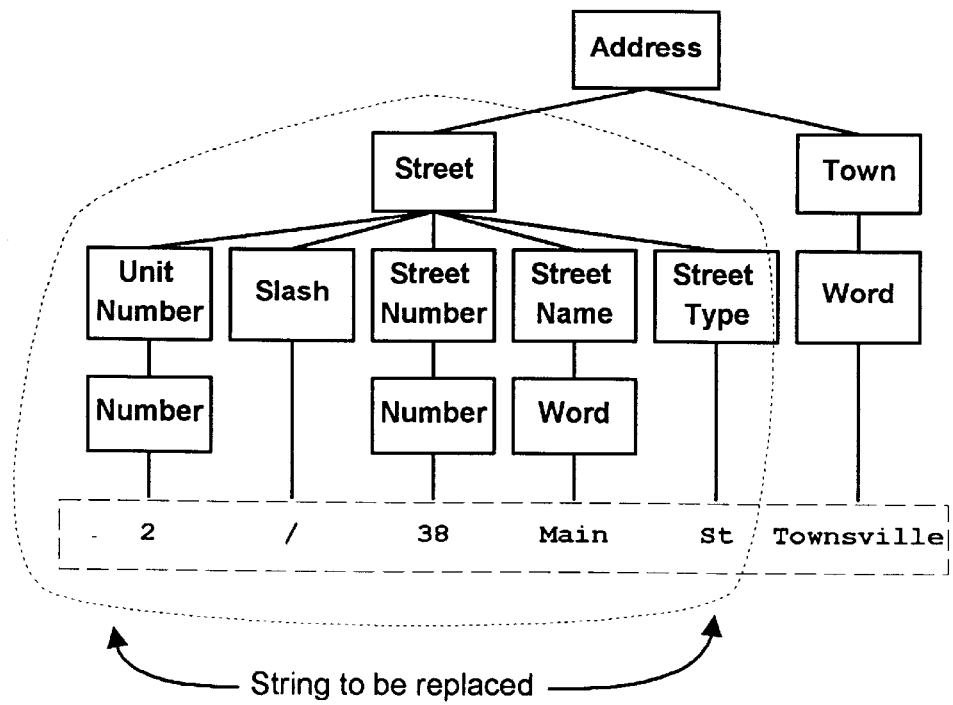
Figure 10:
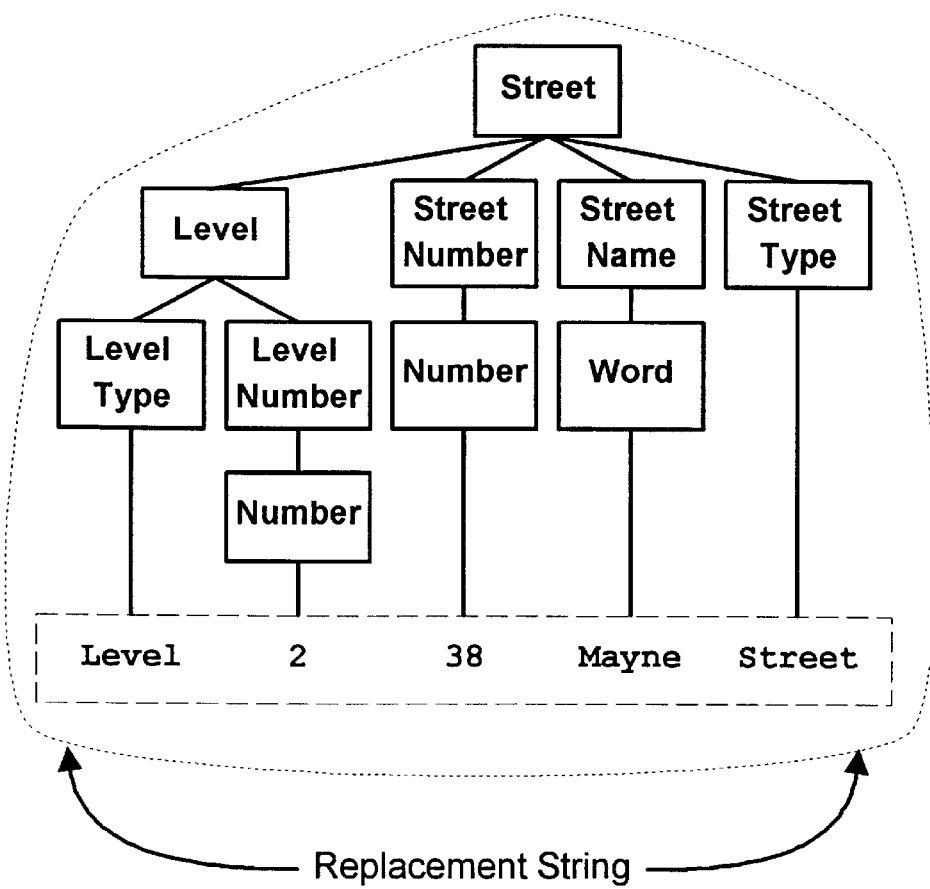
Figure 11:
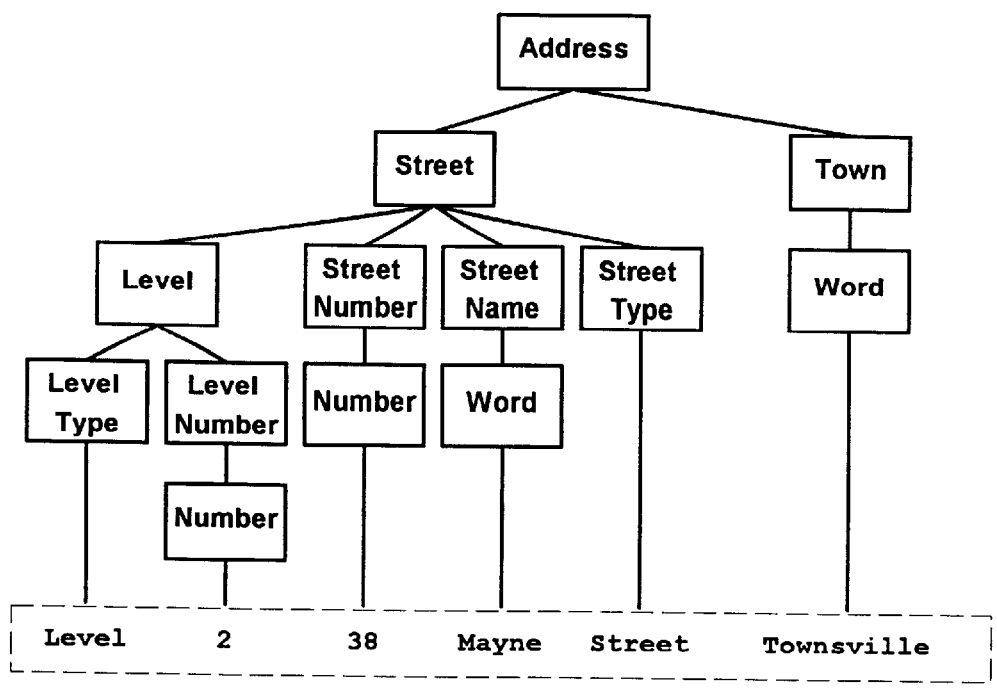

FIGS. 9, 10 and 11 provides an example of modifying a text object of the invention;

FIG. 9 shows a text object before modification;

FIG. 10 shows the replacement text object; and

Figure 1:
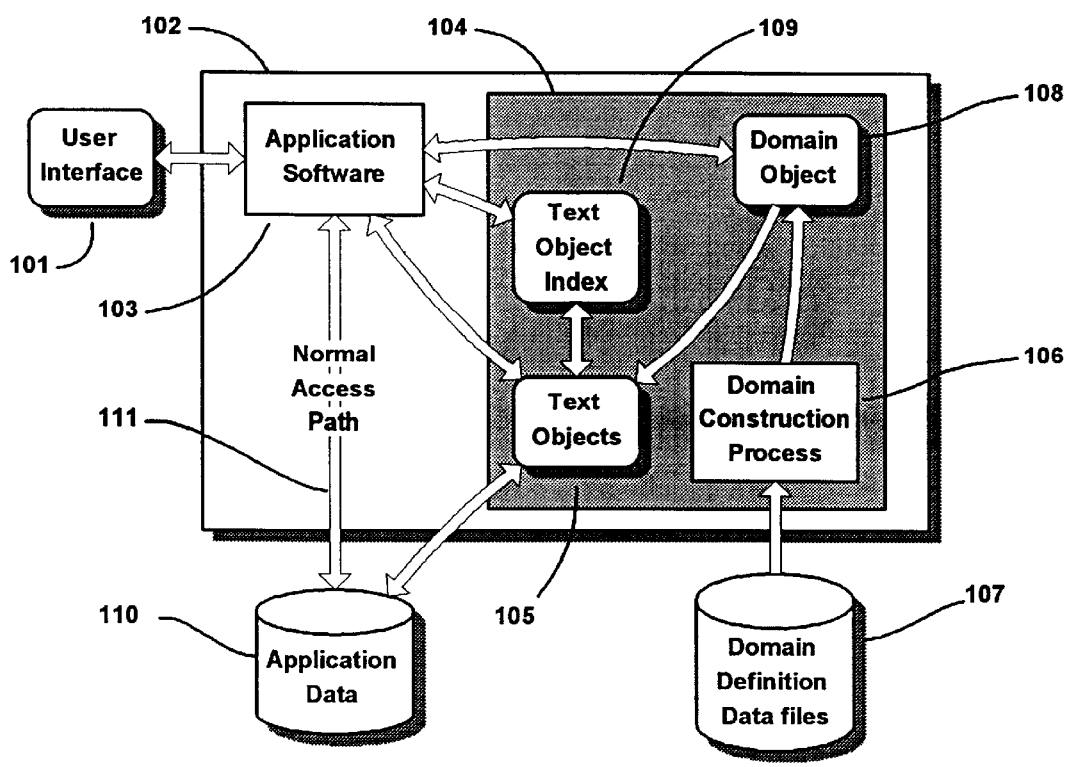
FIG. 1 is a diagram illustrating the architecture of a system for enabling the processing of free-format data in accordance with an embodiment of the present invention.
Figure 12:
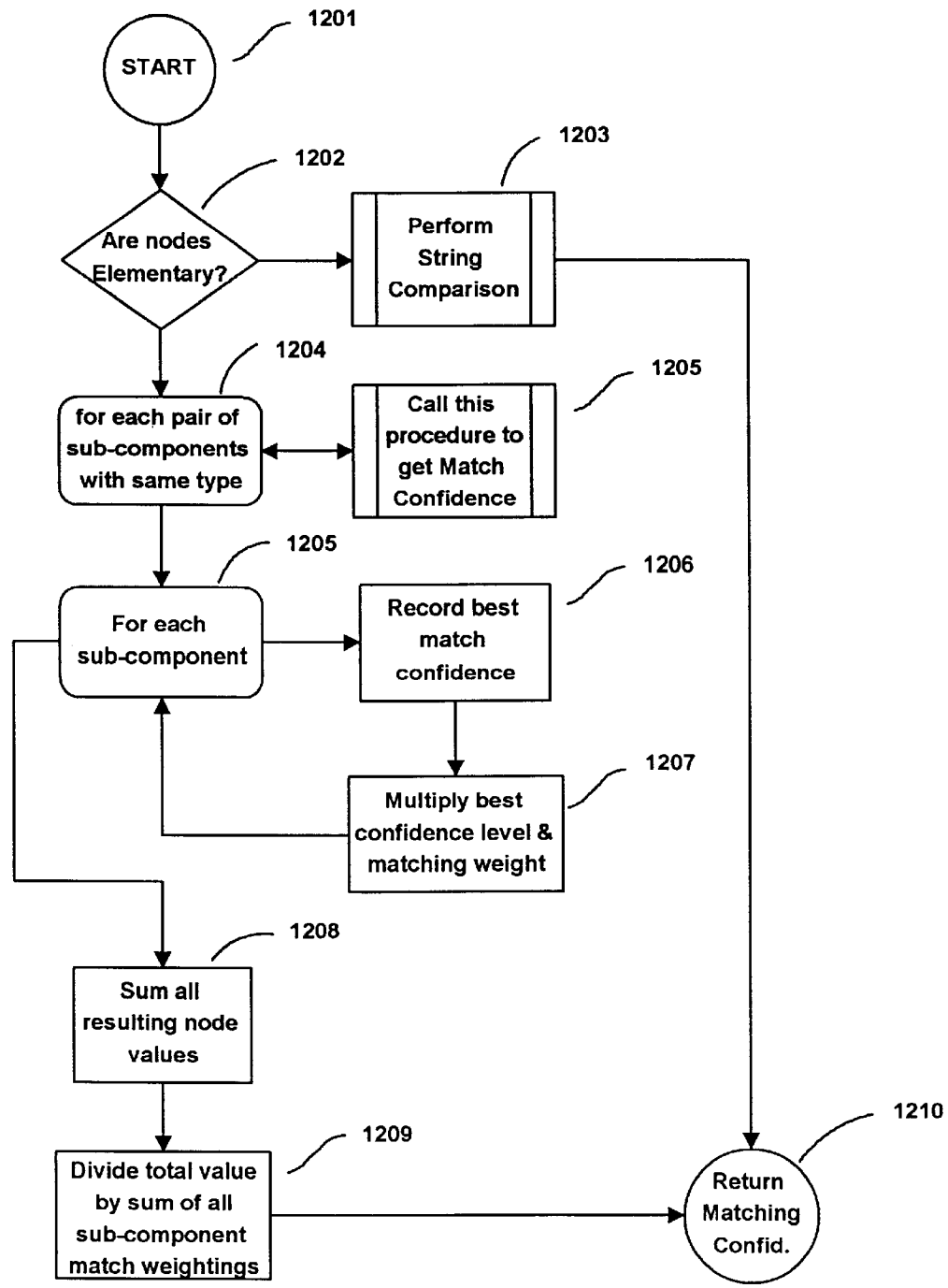
Figure 13:
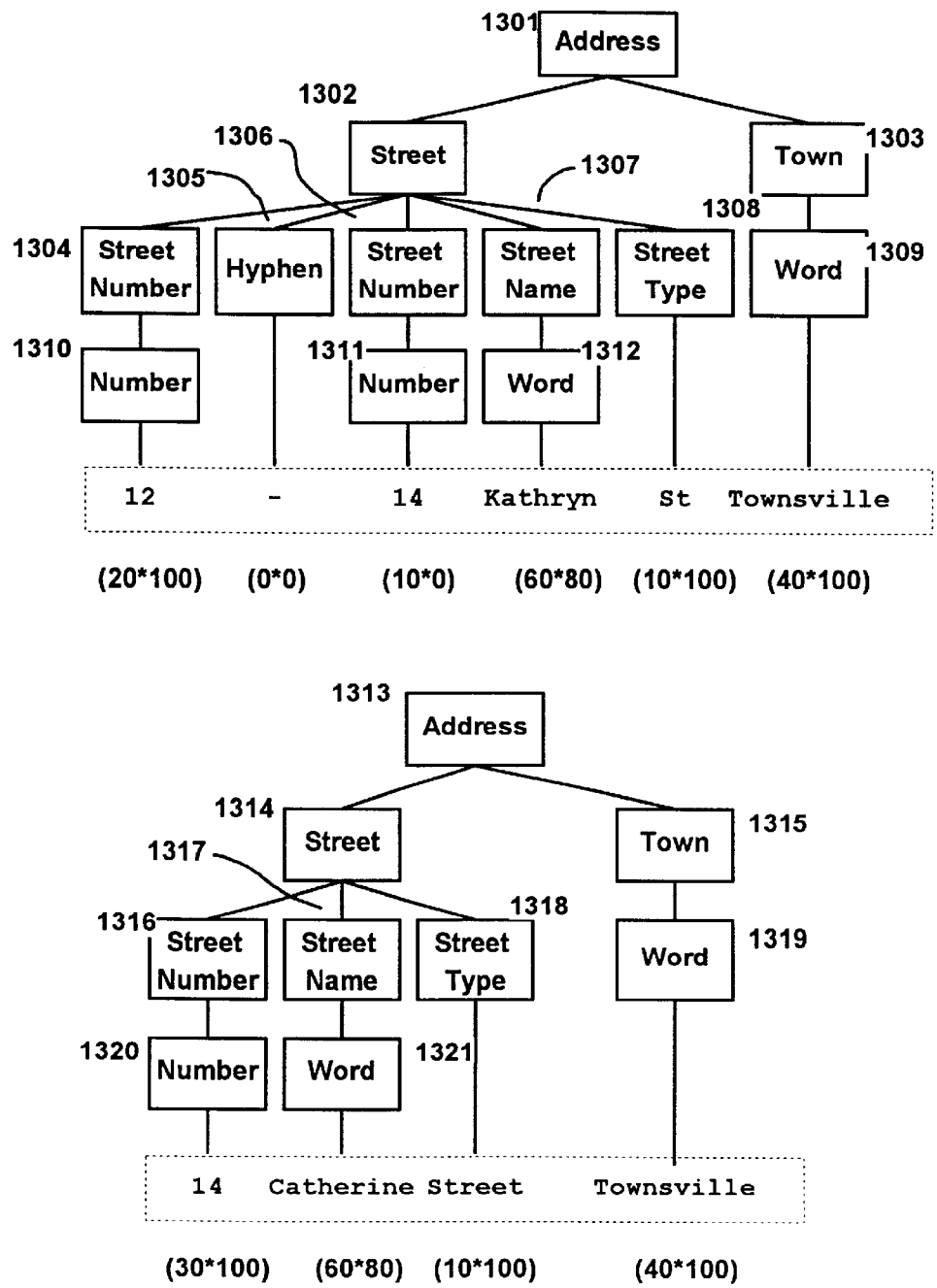
Figure 14:
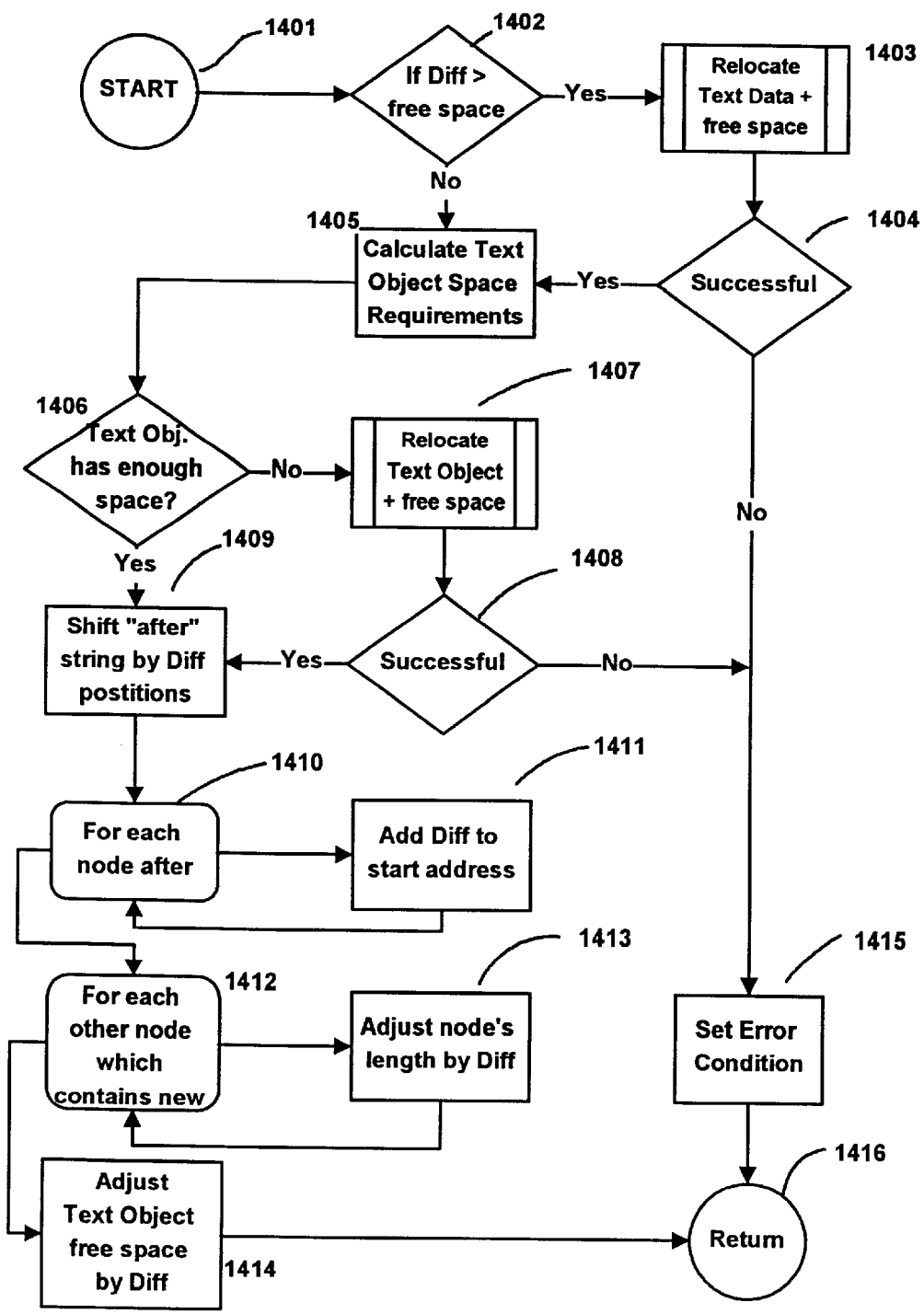
Figure 15:
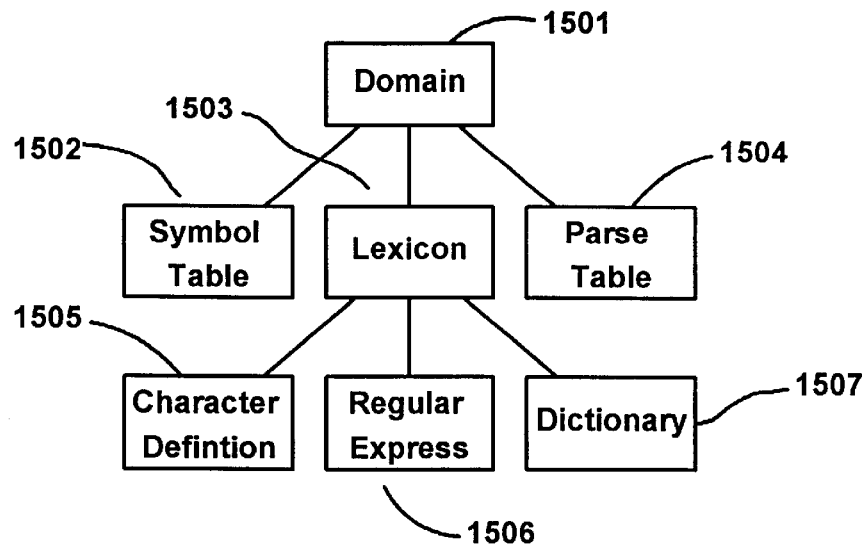
Figure 16:
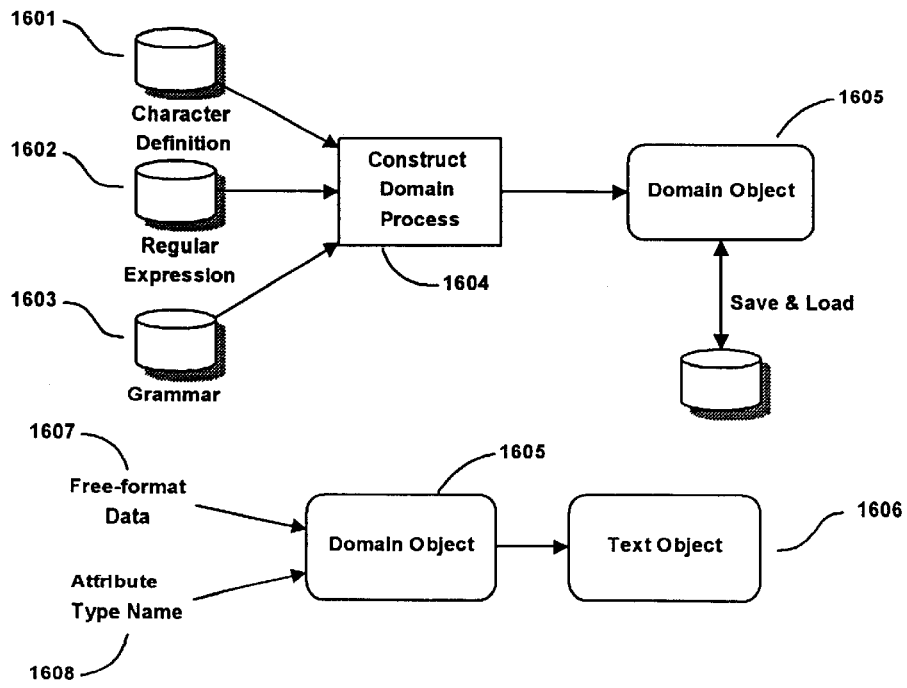

FIG. 11 shows the text object referred to in FIG. 9 after it has been modified;

FIG. 12 is flow chart illustrating the node matching subroutine used by other methods;

FIG. 13 illustrates examples of text objects in accordance with embodiments of the present invention for illustrating a method of comparison of text objects in accordance with an embodiment of the present invention;

FIG. 14 is flow chart illustrating the "adjust node" subroutine used by other methods;

FIG. 15 is a diagram illustrating the architecture of the domain object block of FIG. 1;

FIG. 16 is an illustration of the domain construction process of FIG. 1 in more detail;

FIG. 17 provides two examples of standard transliteration tables. One for Japanese Katakana and one for Greek.

Figure 20:
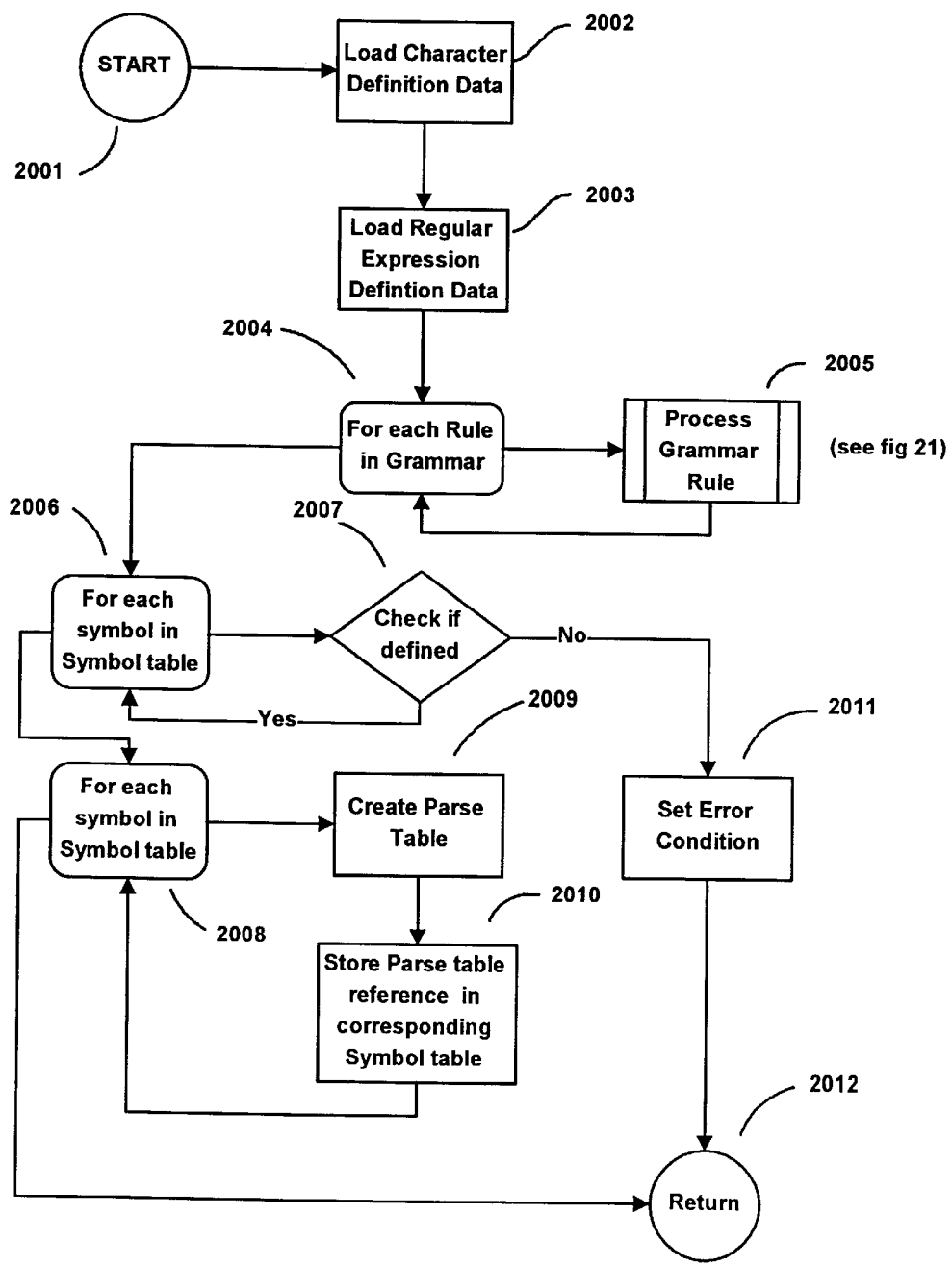
Figure 21:
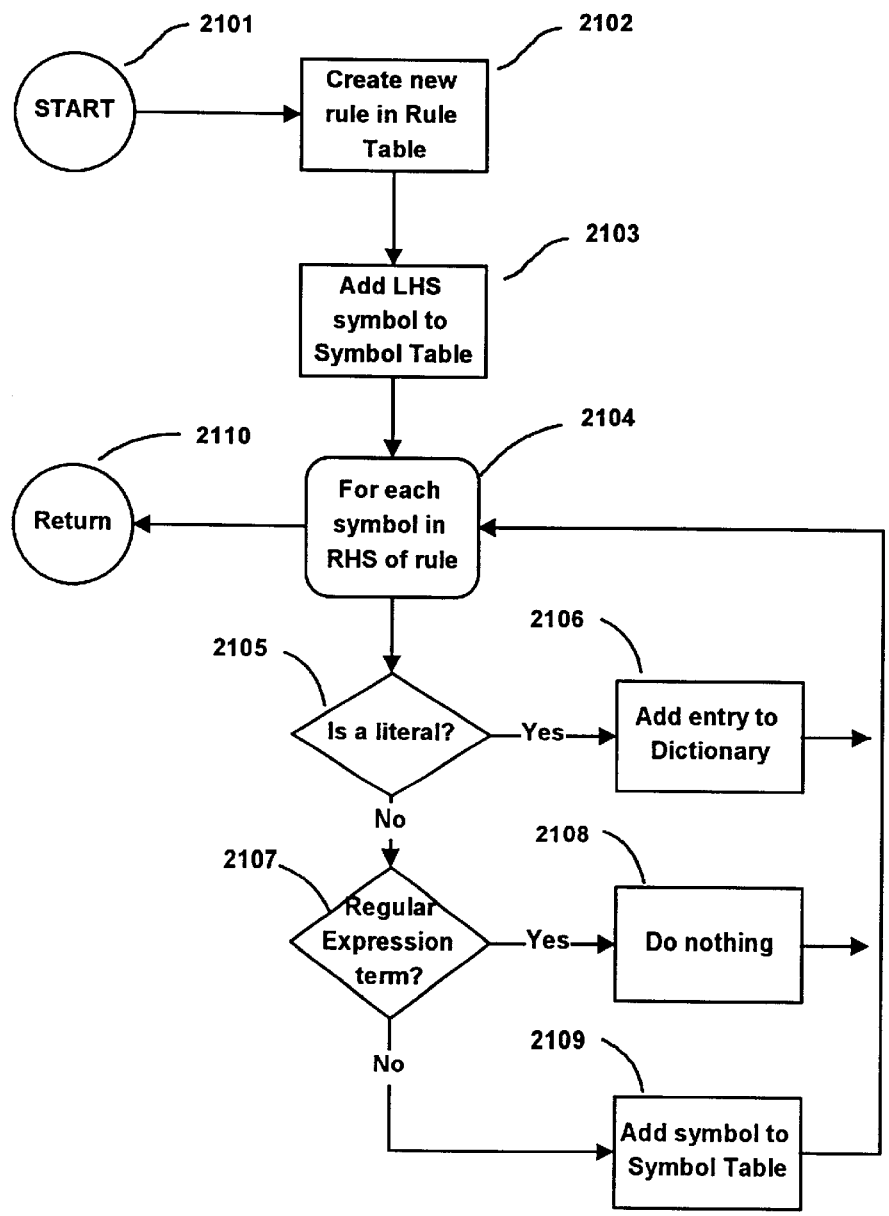

FIG. 18 contains tables illustrating Regular Expression Definition data;

FIG. 19 illustrates a demonstration grammar data file;

FIGS. 20 and 21 provide flow charts of the domain object construction process block of FIG. 1;

FIG. 22 illustrates an example session with a implementation of the invention within a SQL relational database system.

Although the following descriptions use English name and address examples, the invention can be equally applied to any domain of free-format text.

As discussed in the preamble of this specification, the present invention relates to an entirely new concept and approach for processing computerised information, in particular free-format data. As discussed above, the idea is to produce from the free-format data a "text object" which may be stored in a computer and which can be used to obtain information about the free-format data, compare records of free-format data and manipulate the data. This is achieved without it being necessary to construct complex databases having many fields.

FIG. 1 is a diagram showing the configuration of an entire "virtual data" system in accordance with an embodiment of the present invention. It comprises a user interface 101, a processor 102. The processor 102 can be a standard computer system and has a general configuration such as a CPU, a computer memory and mass storage device. The user interface 101 can be a standard keyboard and VDU, and/or an interface to another computer system. User interfaces like these, along with other equivalent interfaces, are well known.

For the purposes of the internal storage requirements of the invention, no distinction will be made between the computer memory and the mass storage device and will be referred to as memory.

Loaded into the memory of the processor 102 is standard system software well known to those skilled in the art, such as a operating system and a database system (not shown), one or more application software systems 103 such as an accounting package or word processor, and an embodiment of the present invention 104, for producing text objects 105 from free-format data. The system 104 comprises a domain construction process 106 which is arranged to take a plurality of input data 107 (in this example in the form of data files) and build a domain object 108 which is used to produce text objects 105. Each "domain" will include all the grammar and syntax rules necessary for that particular domain of free-format data. For example, one domain may be international name and addresses and will include all the information necessary to analyse free-format international name and address data to produce a text object. Another domain may be a commodity description knowledge base, another one may be a transportation industry knowledge base. Domains may be produced to handle any free-format data. The domain construction process 106 is essentially an engine which works on the knowledge bases (input files) for the particular domain type to produce the domain object 108 for that type.

Referring again to FIG. 1, a text object index 109 may be produced by processing a number of text objects 105, and this will be described later.

It should noted, as shown in FIG. 1, that the invention 104 provides a layer between general application software systems 103 and their stored data 110. Unlike "Knowledge Based Management Systems" described above, this invention allows the free-format data to remain in its original location and legacy application software to operate using the original access paths 111.

TEXT OBJECT

Structure

Figure 3:
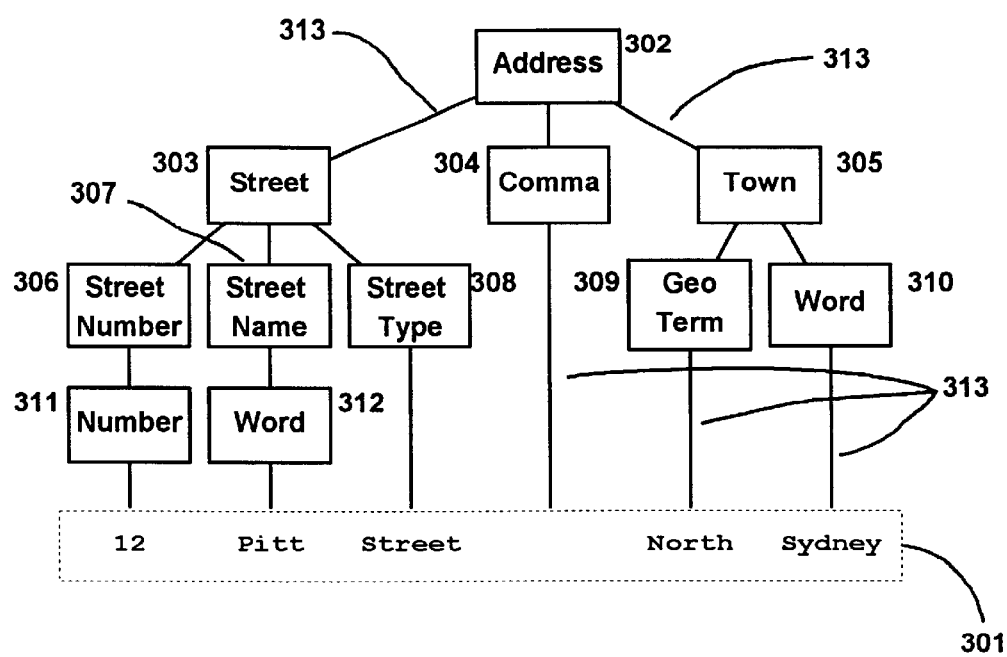
FIG. 3 is a more detailed structural view of an example text object produced by operation of the embodiment of the invention on free-format data.

FIG. 3 is a schematic diagram of the detailed structure of an example text object in accordance with an embodiment of the present invention, in order to assist with illustrating the concept.

The example free-format data illustrated in FIG. 3 is a street address, "12 Pitt Street, North Sydney" (designated by reference numeral 301 ). In prior art databases, this information may have been stored in a single "address" field or may have been divided into a number of separate fields corresponding to the various attributes, i.e., street number, street name, street type and town. Refer to FIG. 4 for other examples of common Australian address formats. As discussed in the preamble, the prior art database format requirement for a separate field for each attribute gives rise to much complexity and, where the information is intricate, it is cost prohibitive and even impossible to produce a field for every attribute of the free-format data.

The text object (illustrated in FIG. 3) comprises a plurality of component nodes 302–312. The text object can be represented as a text node tree, having branches (eg 313) wherein the component nodes 302–312 are positioned in a predetermined hierarchy. The "lowest" hierarchy is at the bottom of the text node tree and the "highest" hierarchy is at the top of the text node tree. The node 302 at the top of the node tree will be refer to as the "root" node. It will be appreciated that components of the text object can be stored in any convenient manner in a memory of a processing means, could be nested within each other, for example, refer to each other in some way, etc. The text object is able to be represented as a text node tree, but that does not mean that it is stored in memory in this way. As long as the components of the text object can be processed in such a fashion that the components act like component nodes of a text node tree as represented in the figure, then this is sufficient.

Note that each component node 302–312 could be considered text objects themselves. This recursive definition allows all the functions of the present invention to be applied to each component.

The architecture of each component node 302–312 includes:

An attribute type identifier (which in this embodiment is an integer) which identifies an attribute type of the free-format data 301 associated with the text object. For example, component node 303 includes the attribute type identifier <Street>, indicating that this component node 303 is associated with the element of the free-format data which gives is the Street, i.e., "12 Pitt Street". Component node 302 is the main component node for the text object illustrated in FIG. 3 and includes the attribute type identifier <Address>. The component node 302 is therefore associated with the entire free-format data record in this case, being "12 Pitt Street, North Sydney", which is an address. Note that component node 302 is "higher" in the hierarchy in the text node tree than component 303; the <Address> component includes within it the <Street> component. The hierarchy of the component node 302–312 within the text node tree is in fact determined by the attribute type identifier of the component node and by grammatical rules which determine that the attribute should be of a lower or higher hierarchy.

A pointer to the starting position of the actual element sub-string of the free-format data associated with a component node. The free-format data is stored as a string in memory and the pointers point towards the beginning of the character string. In the example, component node 303 would point to numeral "1" of the address.

An integer containing the character length of the element. In the example, component node 303 would have a length of 14 (including space characters after "12" and "Pitt") which would in effect point to the last letter "t" of "Street".

An array of subordinate component nodes. For example, for component node 303, nodes 306, 307, 308 are all directly subordinate in the hierarchy and nodes 311, 312 indirectly subordinate. This array enables the component nodes to be related to each other in the text node tree construction.

a boolean variable indicating whether this attribute type identifier is for a "low level" matching element. "Regular expression" terms such as <word> and <nbr> are not matched against each other. Matching of these term is performed at the next level up the hierarchy (e.g. <Street Name> 307). A node is flagged as a low level matching component if it either: is a literal which was located in the dictionary (e.g. nodes 308, 309); or contains "Regular expression" terms (e.g. nodes 306, 307, 305).

an integer representing the element's match weighting. This indicates the relative importance of each of the elements when performing comparisons between text objects. For example: when comparing "Level 3, 45 Pitt st" with "3rd Floor, 45 Pitt St" the fact that the elements "Level" and "Floor" are not equal is insignificant. The "match weighting" values are specified in the grammar rules used to construct the domain object.

depending on time/space considerations, other optional data items used to assist the "matching" processes. Refer the section on "text string operations" below for more details.

an integer indicating the parsing priority. This will be described later.

a boolean value indicating whether this component node is responsible for deleting and moving the piece of text it points to. The two conditions when a component is responsible for its text are: 1) When a outside process requests that the text object manage the entire text string, the text object "root" node is flagged as being responsible for the text string. 2) When a implied value is created. See below for details.

a integer value representing the free space available at the end of the buffer in which the free-format text is held. This value is calculated during the creation of the text object and is usually only applicable to the "root" node of the text object.

In the text node tree the foot of the hierarchy is a component node dealing with an element for each token of the free-format data, in this case being <number> 311, <word> 312, <street type> 308, <geographic term> 309, <word> 310.

Further up in the hierarchy are component nodes for more generic attribute type identifiers. For example these are <street name> 307 for the word "Pitt", <Street> 303 for the three tokens "12 Pitt Street", <town> 305 for the tokens "North Sydney" and, at the top of the hierarchy of this particular free-format data record, the attribute type identifier <Address> 302.

Attribute Type Identifier

It will be appreciated that the attribute type identifiers can be stored in any form, i.e., they need not be stored as integers but could be stored in any representation. A program engine is provided enabling access to the text node tree and this engine has the information necessary to identify the attribute type identifiers as stored.

Parsing Priority

To assist in the processing of ambiguous free-format data, each component node contains an integer indicating the "parsing priority" of the element. These values are assigned during construction of the text object and are used to select the best text node tree if more than one exists for a particular ambiguous free-format text. For example: "12 Pitt St Nth Sydney" contains two interpretations. Although "12 Pitt St Nth" is a valid street address, it has a lower priority than "Nth Sydney" and therefore not selected. These "parsing priority" values are specified in the grammar rules used to construct the domain object (see below).

Implied Fields

Another feature of the present invention is the production of extra implied sub fields in a text object, in the form of the creation of extra component nodes for information that is not actually explicit in the original text. For example, "Mr John Smith" has an implied sub field "sex" with a value "male". The text object can be created with an extra component node dealing with this element and having the attribute type identifier "sex".

Normally these implied fields will be created during the parsing process and are specified in the grammar, but they can be added manually if required. See the description of the "Add Sub-component" function below.

Interface

The text object acts as a "virtual interface" enabling access to the free-format data and facilitating all normal database operations on the free-format data. The user does not "see" the internals of the text object, but can query the text object via the associated program engine (query processing means) and, by virtue of the structure of the stored text object, the attribute type identifiers and other data being placed in nodes, can perform all the normal database operations on the free-format text record.

All the below operations require that the text node tree be searched for specific attribute types. This searching is performed by the engine using recursive procedure calls. This technique is very well known within computer science. Refer to the book "Data Structures and Program Design" by Robert Kruse (Prentice Hall) for a description of recursion.

Another embodiment of this invention may speed up the above procedure by performing the above process and create a lookup table containing every sub-attribute and sorting by the attribute type identifier. This technique is well known to those skilled in the art.

Function Overview

These operations include:

"Get Sub-component" Requests the text object to supply (zero, one or many) values for the respective attribute type.

"Compare Text Objects" Compares two text objects and reports a confidence value that indicates how closely they match.

"Contains component" Tests if a particular text object contains a specific value for a particular element and returns a confidence, e.g., one could obtain all free-format data records which include Pitt Street as the "street". This would be one way of finding how many people on a database live in Pitt Street where the database includes free-format data in an address field and without requiring a string search (which can often give rise to error).

"Modify Sub-component" Changes the value of a particular element of a text object to a specific value. For example, change "Pitt" to "King".

"Add Component" Adds extra data to the text object by appending a new sub-component node to the respective node. Future operations will reference this information.

Get Sub-component

Figure 5:
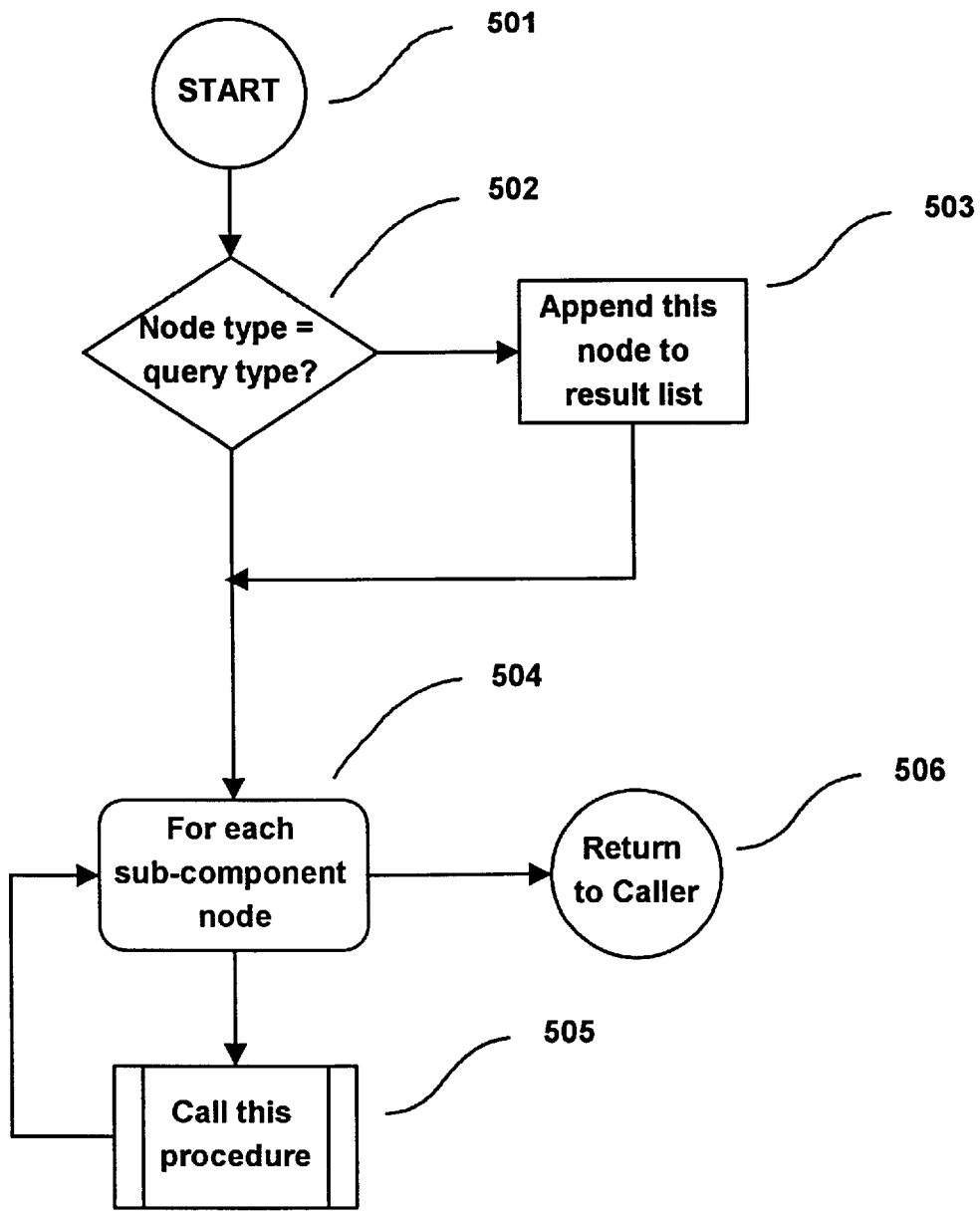
FIG. 5 is a flow chart illustrating a method for getting a sub-component of a specific type from the text object of the invention.
Figure 6:
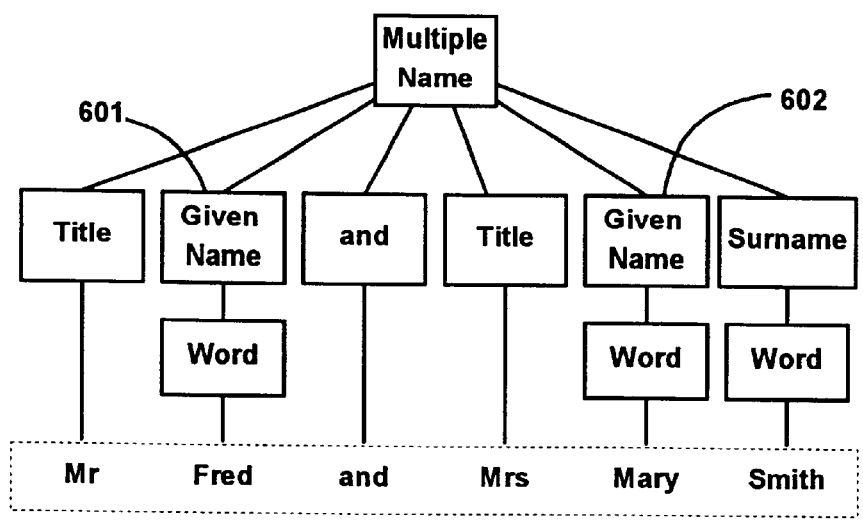
FIG. 6 illustrates the results of the get sub-component method.

When the "Text Object" is queried, an attribute type identifier is supplied and zero, one or more "Sub-component Nodes" are returned. These "Sub-component Nodes" point to the text of the required elements. FIG. 5 illustrates this method. Beginning this recursive procedure with the "root" node of the text object, starting at 501, a determination is made (502) as to whether the attribute type of this node is same as the required attribute type. If it is, a pointer to this node is appended to the result list at step 503. Continuing with step 504, for each sub-component node referenced by this node recursively call this procedure 505. Then return to caller 506. FIG. 6 illustrates the node tree for "Mr Fred and Mrs Mary Smith". Searching the tree for nodes with attribute type <Given Name> will return a list containing pointers to two nodes 601, 602. These nodes point to the sub-strings "Fred", "Mary" respectively.

Another version of this operation takes a text string as a parameter. Only nodes containing the same attribute type and same text string (ignoring case) are added to the list. For example: calling this function with an attribute type <Given Name> and text string "FRED" would return a list containing one node.

Yet another version of this operation takes as parameters a text string and a confidence level. Only nodes containing the same attribute type and have a text string which matches the supplied string with a confidence above the supplied level are added to the list.

Compare Text Objects

This operation compares two text object and returns a confidence level indicating how closely they match. It performs this by:

1. Determining if the "root" nodes of the two text object have the same attribute type. If they do not, return a zero confidence level to the caller.
2. Otherwise, call the "Match Node" subroutine (described below) with the "root" nodes of the two text objects and return the result of that operation to the caller.

For example: passing the two following text objects will return a confidence of 100%.

<Address> "12/34 PITT ST SYDNEY 2000 NSW"

<Address> "Unit 12 34 Pitt Street, SYDNEY N.S.W., 2000"

Contains Sub-component

This operation searches one text object for a sub-component which matches a second text object. If found, it returns to the caller a confidence level indicating how well they match. This operation is achieved by first calling the "Get Component" function (describe above) passing the component type of the second text object. If successful, it calls the "Match Node" subroutine (described below) with the "root" node of the second text object and the node of the result of the "Get Component" function.

For example: passing the two following text objects will (depending on how the string matching procedures are set up) return a confidence of approximately 80%.

<Street> "Kathryn Street"

<Address> "12–14 Catherine St, Dubbo NSW 2830"

Add Sub-component

This operation appends an extra component node into the text object. Although the value of this element is not contained in the original free-format text, queries performed on the text object return the correct results. For example: a text object pointing to a record containing "Dr Chris Smith" may need to modified to indicate that the person is a female. Invoking the Add Component function containing a sex attribute type with a value of "female"will append the respective component node to the text object.

Modify Sub-component

Figure 8:
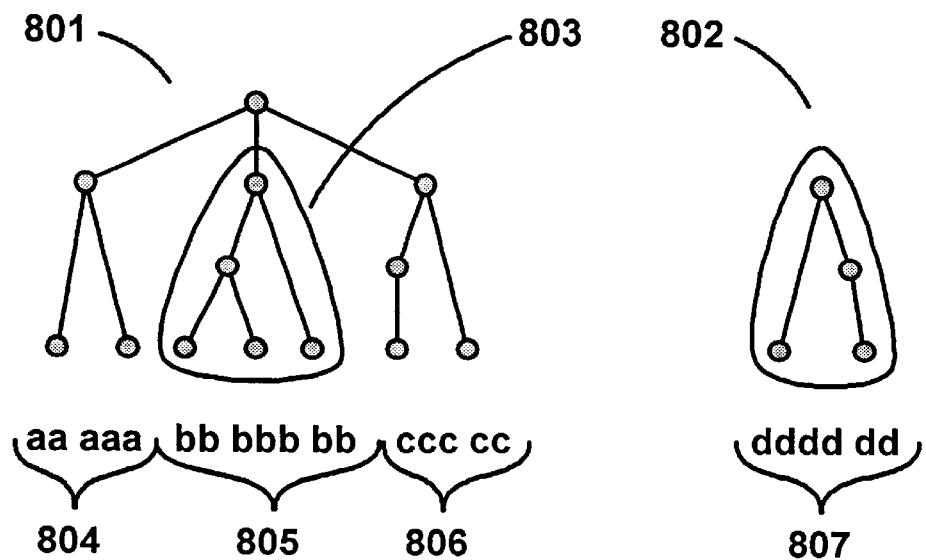
FIG. 8 is an illustration of the mechanics of modifying a text object of the invention.

FIG. 8 illustrates the mechanics of the "Modify" operation. The text object to be modified is represented by 801. The actual text data consists of the sub-string to be replaced 805 and the sub-strings before 804 and after 806. Within the main text object 801, the sub-tree 803 represents the sub-string to be replaced 805. The replacement text string 807 is represented by another text object 802.

Figure 7:
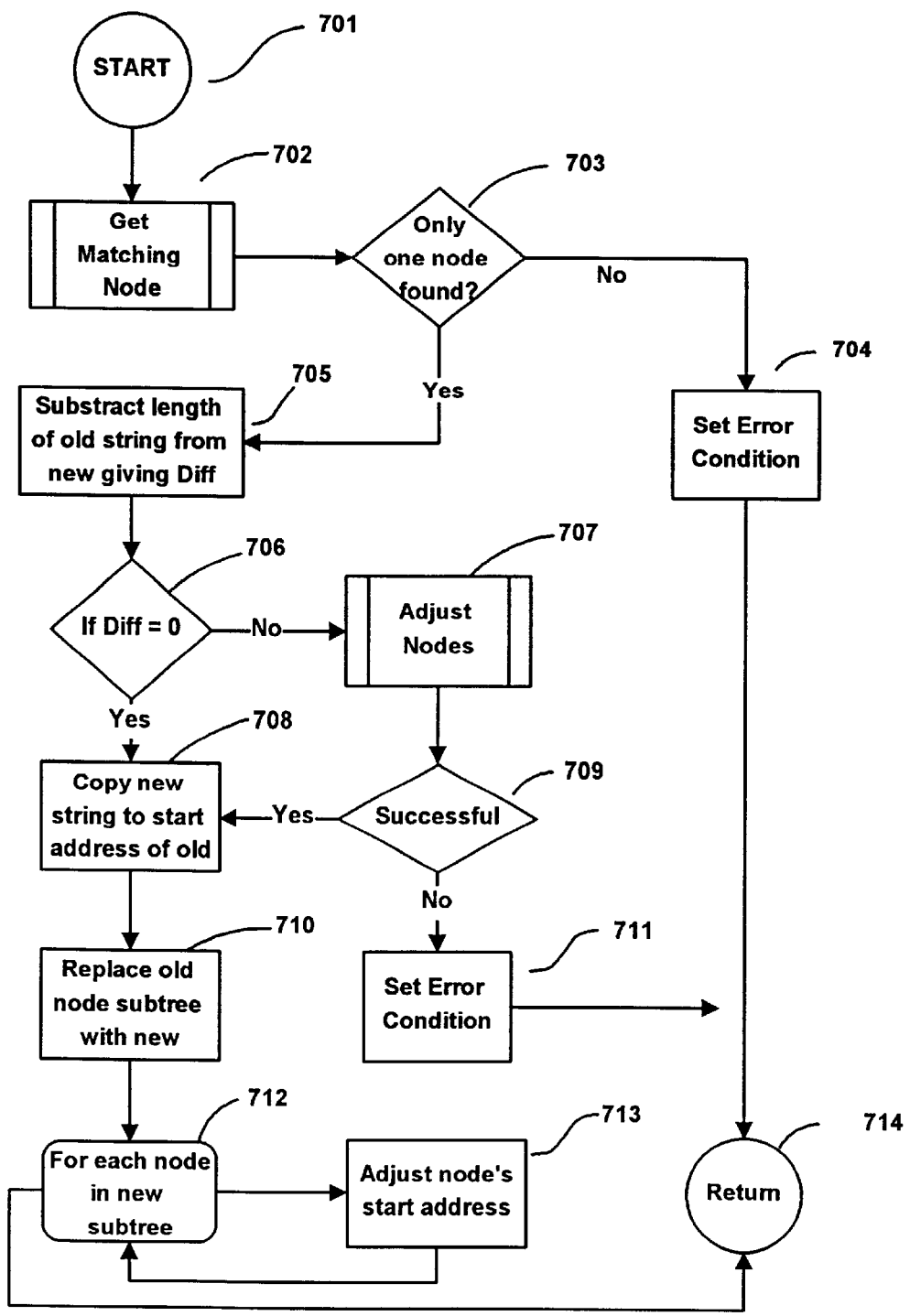
FIG. 7 is a flow chart illustrating a method for modifying a sub-component of a text object of the invention.

FIG. 7 provides a flow chart of the "Modify" procedure. Starting at 701, a call to the "Get Component" function (described above) is performed to locate the required component node at step 702. The results of this function call are tested (step 703) to ensure that one and only one component node is returned. If zero or more than one nodes are returned, a error condition is set 704 and the procedure returns to the caller 714. Otherwise, the procedure continues with step 705 by calculating the difference (Diff) in length between the sub-string to be replaced 805 and the new replacement sub-string 807. If the difference is not zero (i.e. the string have unequal lengths) invoke the "Adjust Node Variables" subroutine 707 (described below). If the subroutine 707 is unsuccessful, set a error condition 711 and return to caller 714. Continuing the procedure at step 708, copy the new replacement string 807 into the location of the old string 805. Replace the old node sub-tree 803 with the new sub-tree 802 at step 710. For each node in the new sub-tree 712 adjust the node's "text start address" variable by adding the starting position of the new sub-string 713. Then terminate this procedure and return to caller 714.

FIGS. 9, 10 and 11 provides an example of the "Modify" operation. FIG. 9 shows a text object before modification. FIG. 10 shows the replacement text object and FIG. 11 shows the text object referred to in FIG. 9 after it has been modified.

The extra versions of the "Get Sub-component" operation described above also apply to this operation.

Subroutines

The operations described below are invoked from other text object procedures described above.

Match Node

This procedure compares two elements with the same attribute type and returns a confidence level value indicating how closely they match.

FIG. 12 shows a flow chart for the "Match Node" operation. Starting a 1201, a determination is made as to whether the nodes being compared are low level matching components at step 1202. If the two nodes are low level matching components, perform the "String Comparison" procedure (described below) at step 1203 and return to caller 1210. Otherwise, if the two nodes contain sub-component nodes recursively invoke this procedure 1205 with all combinations of sub-component pairs which have the same attribute type (step 1204). Record the best confidence level for each 1206. Multiply each node's confidence level by its respective matching weight value 1207. Sum all the resulting values into one confidence value 1208. Divide that value by the sum of the match weighting's 1209 and return to the caller 1210.

FIG. 13 contains an example showing the matching process. Within the text object's node tree there are three types of component nodes:

1) nodes which contain sub-component nodes;
2) low level matching components near the foot of the node tree; and
3) nodes which are contained within the low level matching components and represent simple "regular expression" terms. (Refer to the description of the grammar file for details of the terms.) These nodes are not used in the matching process.

In this example text object, the nodes 1301, 1302, 1313 and 1314 contain sub-component nodes. The nodes 1304, 1305, 1306, 1307, 1308, 1309, 1315, 1316, 1317 and 1318 are low level matching nodes. The nodes 1309, 1310, 1311, 1312, 1319, 1320 and 1321 are simple "regular expression" terms.

In following calculation, the first number within the parentheses is the weighting value for that component. The second number is the best result from the node matching procedure for that node. The number on top is the node's reference label in FIG. 13.

To calculate the matching confidence for the "Street" components:

| 1304 | 1305 | 1306 | 1307 | 1308 |
|---|---|---|---|---|
| (20\*100) + | (0\*0) + | (10\*0) + | (60\*80) + | (10\*100) + |
| 1316 | 1317 | 1318 | | |
| (30\*100) + | (60\*80) + | (10\*100) | | |

= 15400
(20 + 0 + 10 + 60 + 10 +
30 + 60 + 10 )

= 200
15400 / 200
= 77%

To calculate the matching confidence for the "Address" components we perform the same procedure with the "Street" and "Town" components:

| 1302 | 1303 |
|---|---|
| (60\*77) + | (40\*100) + |
| 1314 | 1315 |
| (60\*77) + | (40\*100) |

= 8620

60 + 40 +
60 + 40
= 100

17240/200
= 86.2%

This value indicates the two pieces of text match "quite closely". Values greater than 90% indicate a match that is "very close".

The above procedure may be improved by applying "Fuzzy Logic" techniques. Fuzzy logic techniques are well known to those skilled in the art and many suitable reference books are available.

Adjust Node Variables

This subroutine is called from the "Modify Component" procedure described above. The purpose of this routine is adjust the actual free-format text and all corresponding sub-component nodes and located after the node being replaced so that the new replace sub-string and sub-tree fit exactly. If the old sub-string and the new replacement sub-string are the same length, this subroutine is not invoked.

FIG. 14 shows a flow chart of the steps required. Starting at 1401, a determination is made at step 1402 as to whether there is enough space in the current text buffer to accommodate the change. This is done by referring to the "free space" variable (described above) of the "root" node of the text object. If there is not enough space, the "Relocate Text Data" subroutine is invoked 1403 to create free space in the text object. If this routine is unsuccessful 1404, an error condition is set 1415, the procedure terminates and return to the caller 1416. Otherwise, the procedure continues at 1405 and calculate the extra space requirements of the modified text object by subtracting the size of the old sub-tree being replaced from the size of the new replacement sub-tree. A zero or negative value indicates that the text object has enough space to accommodate the change. If text object requires more space 1406, the "Relocate Text Object" subroutine is invoked 1407 to create free space in the text object. If this routine is unsuccessful 1408, an error condition is set 1415, the procedure terminates and return to the caller 1416. If the above steps are successful, the procedure continues at step 1409 and shifts the "after" string 806 in FIG. 8 by the difference between the old sub-string 805 and the new replacement sub-string 807. For each node which refers to components located after the replacement node 1410, add this difference to the node's start address variable 1411. For each node which has the replace node as a sub-component 1412, add the difference to the node's length variable 1413. Adjust the text object's "free space" variable by subtracting the difference 1414 and return to caller 1416.

Relocate Text Data

This subroutine is invoked by the "Adjust Node Variables" to move the current free-format text into a space large enough to accommodate the required modification. The ability of this routine to perform this operation depends on where the text data is stored. Typically, free-format data such as "address" information is stored in fixed length database fields and will not be able to be relocated. If this is the case, this routine will set an error condition and return to caller. However, if the text data is stored within moveable storage such as the computer's memory or with a object-oriented database as a non-persistent object, this procedure will relocate the text data and return to the caller with the text data's new address.

Relocate Text Object

This subroutine is invoked by the "Adjust Node Variables" to move the current text object into a space large enough to accommodate the required modification. The ability of this routine to perform this operation depends on how this invention is implemented. If the text object is stored within moveable storage such as the computer's memory or with a object-oriented database as a non-persistent object, this procedure will relocate the text object and return to the caller with the text object's new address.

For a description of Object-Oriented databases and object persistence, refer to the book "Object-Oriented Databases" by Setrag Khoshafian (Wiley Press).

Get Keys

This operation is used exclusively by the "Text Object Index" described below. It provides key information used in updating and querying of the text object index. It recursively searches the text object node tree and returns a list of all the nodes which have been flagged as low level matching components. See above for a definition of a low level matching component. Refer to the description of the Text Object Index below for an example of the output of this function.

Summary of Text Object Benefits

Many records of free-format text may be processed in accordance with this embodiment of the present invention, to produce text objects in each case. Different text objects may have different attribute type identifiers, but it is not necessary to produce a complex database structure having a separate field for each attribute type. Free-format text is stored basically as it is, with the associated text object providing all the facility required to provide all the normal database operations on the free-format data. This essentially enables a computer to handle information in much the same way as a human being does.

Text Object Construction Overview

The text object is produced by an examination of the free-format data by applying natural language processing techniques, such as parsing, which is known in the prior art. Such language processing techniques have been applied to "clean" or "scrub" databases and large and complex software systems have been applied. In each case in the prior art, however, the natural language processing has been applied to analyse the data to enable the creation of new database fields. The idea of maintaining the free-format data as it is and creating a text object as described is a totally new concept.

In this embodiment of the present invention, the processing of each item of free-format text to produce the text object involves, firstly, lexical analysis in which regular expression analyser reads the free-format text and groups the items of the text into tokens with their associated attribute type identifier (e.g., word, number, coma, etc). Each token is then checked against a dictionary for other applicable attribute type identifiers (e.g., Street type, State, etc).

Syntax analysis is then applied and in the present embodiment, the position of each of the tokens in the free-format data is also analysed to provide attribute type identifiers. For example, in the FIG. 5 example, "Pitt" is a plain word not found in the dictionary and therefore probably a proper noun. By analysing its position in relation to the other elements of the free-format data, however, the embodiment can "imply" that it is a <StreetName>. Therefore, "12 Pitt Street" can be classified as a <Street> from the relative positioning of the tokens.

Domain Object

The main function of the domain object 108 (FIG. 1) is to create text objects 105. This function is described in detail below. Other functions the domain object performs relate to maintaining an attribute type table. This table contains the information for all the attribute types defined for its domain.

Structure

FIG. 15 shows the domain object architecture 108 in more detail. It comprises a series of "look up" tables, which include the symbol table (e.g., <Street name> NB the term "symbol" is equivalent to the term "attribute type identifier") 1502 and the parse table 1504 (contains rules for applying the grammar). It also comprises a lexicon 1503 contains a character definition table 1505, regular expression analyser 1506 and a dictionary 1507 (e.g., NSW, VIC, SA). All of these parts are used by a modified "Tomita parser" (described below) to process free-format text to produce text objects.

Text Object Construction

FIG. 16 gives an overview of the operation of the domain object 108 creating a text object 105 of FIG. 1.

In operation, the domain object 1605 uses the attribute type 1608 to locate the respective parsing rules and then "parses" the free-format data 1607 and produces a text object 1606.

Parsing is a known technique for analysing free-format data and a skilled person would be able to arrange appropriate parsing.

Parser Types

The parser may consist of any non-deterministic parser. The common parsing techniques are listed as follows:
Top Down Backtracking Parser
Bottom Up Backtracking Parser Top Down Chart Parser Bottom Up Chart Parser Augmented Transition Network Parser Shift Reduce Parser with Backtracking Tomita's Graph stack Shift Reduce parser The main reasons for selecting Tomita's Graph-stack Shift-Reduce parser for the best implementation of the invention are:

A detailed description of the algorithm is readily available.

The algorithm processes ambiguous text data very well.

The resulting data structures represent ambiguous text data in a very efficient form.

The structure and operation of the parsing process is described in the book by Tomita, M. "Efficient Parsing for Natural Language", Kluwer 1986. A summarised copy of this description is also given in the Appendix to this description.

Modifications to Tomita's Parser

In addition to producing the component node tree described by Tomita, a number of enhancements are required for the text object. These enhancements allow the text object to provide the "virtual data" fields.

Modifications to Tomita's Graph-Stack Shift-Reduce parser for this invention are as follows:

Assigning parsing priorities to the tokens returned from the lexical analyser and to the rules in the parse table. Summing these priorities to obtain the most suitable component node tree for a given free-format text. All of these priorities are specified in the input grammar file 1603 (FIG. 16).

Classifying the component nodes of the syntax tree as either visible or invisible. Low level "regular expression" terms such as <word> are classified as invisible.

Assigning match weightings to all component nodes. These values are specified in the grammar data and are used to determine the relative importance of each of the components when matching two free-format texts.

Procedure

FIG. 16 gives an overview of the operation of the domain object 108 creating a text object 105 of FIG. 1.

This procedure takes a free-format text string 1607 and an attribute type identifier 1608 and creates a text object 1606.

1. Using the attribute type identifier 1608, look up the symbol table 1502 (FIG. 15) to get the corresponding parse table.
2. Call the parser to create a "shared parse forest" as defined in section 2.4 of Tomita's book. A shared parse forest is used to represent ambiguous parse trees within the one structure. It does this by allowing trees to share common sub-trees.
3. Recursively accumulate all the "parsing priorities" of all the sub-component nodes of each node.
4. Based on the values in the previous step, select the best parse tree.
5. Create a new Text Object with the selected parse tree.
6. Recursively search the parse tree to locate and flag specific nodes as "low level matching components". (see above for definition) Refer to FIG. 3 for a simple example of a text object.

Construction of Domain Object

FIG. 16 shows an overview of the domain construction process.

The input files for the domain construction process 1604 include the following:

Character Definition File 1601

This defines all the valid characters of the domain and specifies their usage. The range of usage typically includes alphabetic, numeric, punctuation, space. It also specifies which characters are similar for matching purposes. It also specifies all information required to perform the "text string matching" described below.

In the best embodiment of the invention, this file contains one record per character, and each record contains:

the character in question the character's type (alpha, numeric, etc)

a base character for case and diacritic matching (e.g. "a", "À", "à", "Å"→"A")

a flag indicating the significance of the character. (e.g. vowels are considered insignificant.)

one or more characters for standard international transliteration. (see FIG. 17 for example tables)

This file could also define how character combinations are translated into phonetic representations (e.g. "PH"→"F"). Phonetics is a known technique and a skilled person would be able to arrange appropriate translation tables.

Regular Expression Definition 1602

This defines the structure of the elementary tokens of the system. For example:

A word consists of two or more alphabetic characters. These tokens are represented in the grammar by the term "word".

A number consists of one or more numeric characters. Represented in the grammar by the term "nbr".

The structure of the Regular Expression definition is a basic "state transition table". This technique is well known within computer science. A working sample is shown in FIG. 18.

Grammar 1603

The basic premise of the grammar file is to define all possible tree structures for the text objects created in its language domain.

The grammar file consists of a number of grammar rules in the form "A→$B_1$ $B_2$ $B_3$ ... ". Each grammar rule consists of a LHS symbol <A> and zero, one or many RHS symbols <$B_n$>. The LHS symbol <A> is the name of the component type and the RHS symbols <$B_n$> defines its sub-components. Each of the RHS symbols <$B_n$> can be one of the following:

Another component type name

A literal (enclosed in quotes)

A reserved word

The reserved words represent simple "regular expression" terms as follows:

"word"—one or more alphabetic characters

"nbr"—one or more numeric characters

"A"—one alphabetic character

"9"—one numeric character

Additionally, each attribute type (i.e. LHS symbol) can be assigned a "match weight adjustment". This is used to vary the default match weighting. Match weighting are used when comparing text objects to indicate the relative importance of sub-components during the calculation of the matching confidence. Additionally, each grammar rule can be assigned a "parsing priority". This is used during the construction of text objects to assist in selecting the best structure for the text object when two or more ambiguous structures are available.

All branches at the lowest levels of the hierarchy of rules and attribute type names defined by the grammar must end with literals or reserved words. A simple example grammar is shown in FIG. 19.

Procedure

FIGS. 20 and 21 provide flow charts of the domain object construction process. Starting 2001, the character definition data is loaded into memory at step 2002, then the regular expression definition loaded at step 2003. Processing continues by reading the grammar definition data and for each rule in the grammar 2004, process the grammar rule 2005 by creating a new rule in the temporary rule table 2102; using the LHS symbol of the rule to create a new symbol/component type in the Symbol table if it does not exist already, and then for each symbol on the RHS of the rule (step 2104), if it is a literal 2105, then add it to the dictionary 2106, If it is a recognised "regular expression" term such as "word" or "nbr" 2107, do nothing 2108, otherwise it is attribute/symbol and it is added as a new symbol/attribute type to the Symbol table if it does not exist already at step 2109. After all the grammar rules have been processed, processing continues at step 2006 by checking that each symbol/attribute type added to the Symbol table has been defined. i.e. has appeared at least once on the LHS of a grammar rule (step 2007). If any are undefined symbols/attribute types, an error condition is set at step 2011, the procedure terminates and returns to the caller 2012. Otherwise processing continues at step 2008. Again, for each symbol/attribute type added to the Symbol table, a parse table is created at step 2009, and a reference to this new parse table is recorded in the corresponding Symbol table entry. After all the required parse tables have been created, the procedure terminates and returns to the caller 2012.

Building of parse tables is a well known technique within computer science. Parse tables were originally developed for programming languages. The algorithm for construction of the "LR parsing table" can be found in Aho, A. V. and Ullman, J. D. "Principles of Compiler Design" Addison Wesley 1977. Tomita applied these techniques to "Natural Language Processing" by building parse tables which are non-deterministic in that each entry in the tables can have more than one action.

Note the domain object 1605 can be saved to memory or loaded to operate on a record of free-format data.

Text Object Index

A "text object index" 109 (FIG. 1) is used as a means to perform normal database operations on the "virtual data" fields of a plurality of text objects and their associated free-format text.

The basic concept for the text object index is similar to the concepts published in the book "Human Associative Memory" by John R. Anderson (Wiley 1973). This work described how the nouns in a sentence are used to reference a database of named objects, and then to match the "relationship" links between these objects to the implied relationships in the original sentence. These relationships follow the "Actor-Object-Action" model.

Although similar, the text object index differs from this method in two major ways. 1) All constituent parts of the free-format text are classified and used to reference the index. (i.e. not just the nouns). 2) There are no relationship links between objects.

Looking at the text object index with a different perspective, one could consider the text object index an array with unlimited dimensions where each dimension is one of the low level matching attribute types described above. The text object created from a free-format text string will provide the low level matching components used to query the text object index. So that all references to other text objects which are located at the intersection of the supplied components are returned.

Performance improvements to this basic concept can be provided by applying "fuzzy logic" techniques to the process. Fuzzy logic techniques are well known to those skilled in the art and many suitable reference books are available.

In the best embodiment of the invention, the main part of the text object index is a three column table with the following fields:

Attribute Type Identifier

Representative Value Key

User Supplied Record Identifier

This simple structure allows the text object index to be implemented using the database technology available on the respective computer.

The following example demonstrates how the three column table is used. The basic idea behind the Text Object Index is that all matching free-format texts have the same low level matching attribute. For example, assume the following record has been added to the text object index with a "user reference" of 123.

"Unit 12 34 Pitt Street, Sydney N.S.W., 2000"

After obtaining the respective text object's low level matching attributes, the following entries will be added to the index:

| | | |
|---|---|---|
| <Unit Number> | "12" | 123 |
| <Street Number>"34" | | 123 |
| <Street Name> | "PITT" | 123 |
| <Street Type> | "ST" | 123 |
| <Town Name> | "SYDNEY" | 123 |
| <State> | "NSW" | 123 |
| <Postcode> | "2000" | 123 |

EXAMPLE 1

A query is performed to check if the following address exists in the database.

"12/34PITT ST SYDNEY NSW"

After creating a text object for this input and generating the low level matching attributes:

| | |
|---|---|
| <Unit Number> | "12" |
| <Street Number>"34" | |
| <Street Name> | "PITT" |
| <Street Type> | "ST" |
| <Town Name> | "SYDNEY" |
| <State> | "NSW" |

Performing intersection analysis on all index entries retrieved with the above attributes-type identifiers and values will yield the record specified at the beginning of this section.

EXAMPLE 2

A query is performed to find all address which contain the Street:

"PITT ST"

After creating a text object for this input and generating the index key set:

<Street Name> "PITT"

<Street Type> "ST"

Again, performing intersection analysis on all index entries retrieved with the above attribute-type identifier and values will yield the correct subset of records including the record specified at the beginning of this section.

The above examples have been over simplified to demonstrate the concept. In a practical system, once the low level matching key set has been generated, all the techniques used in "key word searching" can be applied to each attribute type subset. For more detailed information on "key word searching" techniques, refer to the numerous books and journal articles published by Gerald Salton.

"Key word search" techniques applicable to this invention include:

Storing very common terms in a high speed cache and using this to avoid doing searches on index with terms that will return too many entries.

Using one or more Representative Value Keys that allows for common misspellings. Typically this is the original value with vowels and double constants removed.

Using one or more Representative Value Keys that encodes the original value into a one or more phonetic representations.

Using a Representative Value Key that encodes the original value into a international standard transliteration representation. (See FIG. 17 for examples of Greek and Japanese Katakana transliteration tables.)

Checking the original value against a dictionary of synonyms to obtain the value which represents the full set of synonyms.

Interface/Operations

The following operations can be provided by the text object index.

The interface of the text object index is designed to mirror the standard commands of SQL. SQL is the "Standard Query Language" of relational databases and is very well known within the computer industry.

Insert Text Object

As shown in the previous examples, this operation makes all the required changes to the text object index so that the respective text object reference can be located using any similar free-format text or subcomponent there of.

The steps required by this operation are:

1. Call the "Get Key" function of the respective text object to obtain all of its low level matching components.
2. For each low level matching component, add an entry in the text object index's three column table.
3. Optionally save the respective text object depending on technical considerations of the current computer system.

Select Text Objects

This operation returns all references (normally record identifiers supplied by the system user) to free-format texts which contain the supplied free-format text. For example: to locate all records which contain "Box Rd".

This operation proceeds with the following steps:

1. Build a text object from the query input data.
2. Invoke the "Get Keys" function of the text object to obtain a list all of its low level matching components.
3. Use the attribute type identifier and representative value of each of the component nodes to retrieve all references with any common low level matching items.
4. Perform intersection analysis on the reference returned from the previous step to select the free-format texts which contain all the important low level matching elements of the query data.
5. Obtain the original text objects.
6. Perform a "Text Object" Comparison on each to obtain confidences.
7. Sort according to confidences.
8. Return the results to the caller.

Delete Text Object

This operation takes the user supplied reference key and deletes all records with that reference key.

Update Text Object

This operation updates the entries for a modified text object by first deleting all the previous entries and then reinserting new entries using the "Insert" operation describe above.

Text String Operations

The techniques used to compare two text string to obtain a matching confidence are well known within the computer industry. This section is provided as a quick overview of what text string matching normal involves.

A typical matching procedure could perform the following steps:

1. Check for exact character match without regard to upper and lower case.
2. Check for common spelling mistakes by removing vowels and double constants, then comparing the results.
3. Check for any spelling mistakes by performing comparison functions which allow for character deletion, insertion and transposition.
4. Check for similarity after standard international transliteration. See FIG. 17 for example of transliteration tables.
5. Check for phonetic similarity after translating the string into a standard phonetic representation.

In the present invention, text string matching is performed on certain low level matching component nodes. The values used in steps 1, 2, 4 and 5 of the above procedure may be generated each time the string comparison is done, or alternatively may be generated once when the text object is created and stored within the respective component node. These values could also be used as the "representative value key" in the text object index described above.

Steps 4 and 5 of the above procedure allow the invention to compare free-format data in foreign language text e.g., Japanese Kanji. A phonetic value can be stored for the Kanji symbols, and can be used to compare the Kanji with elements of other free-format data which may not be in Kanji. In other words, this feature facilitates the processing of free-format data in foreign languages. See FIG. 17 and previous description

EXAMPLE APPLICATION OF INVENTION

FIG. 22 gives an example of how this invention could be implemented within a SQL relational database implementation. A description of the SQL statements are as follows:

1. Create a domain object called "US ADDRESS"
2. Initialise it with a Language definition (which contains the character definition and regular expression definition described above and a Grammar definition).
3. Create a text object class called "ADDRESS"
4. Set its domain to "US_ADDRESS" and its type to "Address" (the type name must be defined in the grammar.)
5. Create a database table called "PERSONS" with one of the elements being an "ADDRESS" text object called "Home_Addr".
6. Insert a record into the table.
7. Select all records in the "PERSONS" table with a specific address.
8. Select all records in the "PERSONS" table that have the data in "Home_Addr" column which contains a sub-component "State" with a value matching "California"
9. Select all records in the "PERSONS" table that have the data in "Home_Addr" column which contains a sub-component "Street" that matches "Kathie St" with a confidence level greater than 80%.

Concluding Remarks

Any free-format data record may be analysed by applying the present invention and by constructing the appropriate domain using the appropriate domain construction process and appropriately designed input files. All data can be analysed by computer in this way to produce text objects for all free-format descriptions.

It will be appreciated that there are a number of processing steps for processing free-format data in accordance with embodiments of the present invention. It will be appreciated that each of these steps can be done once during system initialisation and the results saved, or they can be performed at execution time only when they are needed (e.g., every time a query is performed). A summary of these steps is as follows:

Construction of the domain object.
Construction of the text objects text node tree.
Construction of text objects extra implied sub-fields.

In addition to this, there are the other related steps of producing a text object index from a plurality of text objects.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Appendix

This appendix describes the parsing algorithm used in the current best embodiment of the invention. All descriptions in "quotes" are quoted from the book by Tomita, M. Efficient Parsing for Natural Language, Kluwer 1986.

General Terms

Symbol Represents one or more specific token strings. A symbol contains the following data items: an integer representing the symbol identifier (symbol_id); a boolean variable indicating whether this symbol is visible; a boolean variable indicating whether this symbol is a low level matching component; an integer representing the match weighting; an integer specifying which is the corresponding parse table. All of this information is specified in the grammar definition data.

Rule Represents a grammar rule which specifies how a group of symbols are reduced into one higher level symbol. A rule contains the following data items: an integer representing the rule identifier (rule_id); a pointer to a LHS symbol; a vector containing any number of symbol pointers representing the RHS of the rule; a set of implied subfields; an integer specifying the parsing priority of the rule. All of this information is specified in the grammar definition data.

Node Represents one component of the input text string. The "root node" represents the whole input string. A node consists of the following data items: a pointer to the start of the component; a pointer to the end of the component; an integer indicating the symbol_id (component type) of the component; an array of Subnodes; an optional text string used for matching; an integer indicating the parsing priority; a boolean value indicating whether this component is visible to the system user; a boolean variable indicating whether this symbol is a low level matching component; an integer representing the match weighting.

Subnode Subnodes are used to represent ambiguous ways of interpreting the input text string. In an unambiguous text string each component node will have only one subnode in its subnode array. Each subnode contains an array of nodes.

Token Variable Specifies one set of data items which relate to one interpretation of the respective token. A token variable contains the following data items: an integer representing the symbol identifier for the token; an integer specifying the parsing priority of the token; a text string used for matching; a set of implied subfields. All of this information is specified in the grammar definition data.

Implied subfield Specifies all information required to create an extra text node. It contains the following data items: an integer representing the symbol identifier of the subfield; a text string representing the value of the subfield. For example:

the TITLE "Mr" would have a implied subfield of SEX= "Male". All of this information is specified in the grammar definition data.

Global variables

Parse table To build Parse tables we employ a "parsing algorithm that utilizes standard LR parsing tables. Such LR parsing tables can be obtained by any existing methods. . . . The only modification required for our parser is that each entry in the table should be a set of actions, rather than a single action. When conflict occurs, that is, when two or more actions are to be stored in an entry in the table, conventional table constructors either halt or report 'error', or store only one arbitrarily chosen action and give a warning. Our table constructor stores all of them as a set of actions." The algorithm can be found in Aho, A. V. and Ullman, J. D. Principles of Compiler Design. Addison Wesley, 1977. This algorithm is applied to create a parse table for every grammar symbol which is flagged as visible. Note: Visible symbols are used two ways: 1) To represent a free-format text string 2) To represent a free-format text string which is an input parameter to a query operation.

Graph-stack ". . . is a directed acyclic graph, which has only one leaf vertex '$v_0$' labelled with state number 0. The special vertex '$v_0$' is called the bottom of the graph-stack. All vertices whose distance from '$v_0$' is an even number (2*n, where n is positive integer) are called state vertices, and are labelled with a state number. All vertices whose distance from '$v_0$' is an odd number are called symbol vertices, and they are labelled with a grammar symbol.... Also, state vertices are usually represented by variables 'v', 'w' and 'u', while symbol vertices are represented by variables 'x', 'y' and 'z'."

Vertex List 'U[i]' "A set of vertices in the Graph-stack which were created when parsing a[i] (ie the ith token in the input string). Let a[i] be the token most recently shifted. Then, U[i] is a set of top vertices."

Active List 'A' "A set of active vertices in U[i] to be processed.... In standard LR parsing, the number of its elements is no more than one at anytime."

Reduce List 'R' "A set of top edges to be reduced. Each element is a 3-tuple <v,x,p>, where 'v' $\epsilon$ U[i] (ie is a starting vertex of the path to be reduced) x $\epsilon$ SUCCESSORS(v) (ie is linked directly to 'v') and 'p' is a production (grammar rule). The existence of <v,x, p> in Reduce List 'R' means that 'reduce p' is to be applied on all path starting with the edge <v,x>."

Shift List 'Q' "A set of vertices to be shifted. In standard LR parsing, the number of its elements is no more than one. Each element is a 2-tuple <v,s> where 'v' $\epsilon$ U[i] (ie the vertex to be shifted) and s is a state number. The existence of <v,s> in 'Q' means that 'shift s' is to be applied on 'v'." A modification to the shift entry is an additional token variable set. See below for a description of the contents.

Token Variable List 'T' This is a modification to the Tomita parser which allows multiple symbol identifiers to allocated to the one token. Each entry in this list contains the symbol_id, a parsing priority, a matching string and any number of subfield definitions.

Functions

Create Text Object (Parser)
  Get the respective Parse Table for the input symbol
  Create initial vertex in the Graph-stack
  Set token position "i" to 1
  Repeat until no more tokens left
    Get next Token and its variable list
    Parse token
    Shift token
    Increment token position "i"
  Parse "end of input"
  If the root node has been set (ie the string has been accepted)
    Return a error message
  Analyse the parsing priorities of each of the component nodes to obtain most likely parse tree
  Create a new Text Object with the node tree and input text string
  Return the new Text Object Get Next Token and its Variable List
  Apply "Regular Expression Analyser" to string at the current parsing position to obtain one token
  Use the resulting token to lookup the dictionary
  For each matching dictionary entry
    Add an entry to the token variable list 'T'
  Add Regular Expression variables to the token variable list 'T'
  Update the current parsing position to one character past the end of this token Parse Token
  Active List "A" <=Vertex List "U[i]"
  Reset Reduce List "R" and Shift List "Q"
  Repeat until Active List "A" and Reduce List "R" are empty
    if Active List "A" is not empty
      Actor
    else
      if Reduce List "R" is not empty
        Reducer Actor
  Remove one vertex "v" from Active List "A"
  Get the current state from the vertex "v"
  For each entry in the token variable list
    Get the symbol_id from the current entry of the variable list
    Use the current state and the symbol_id to lookup the Parse Table
    If the Parse Table entry is empty, then continue with next entry in the token variable list
    If the Parse Table entry indicates an "accept" state
      Set the node of the current vertex as the root node of the syntax tree
    For each "shift" entry in the Parse Table entry
      add an entry to the Shift List "Q"
    For each "reduce" entry in the Parse Table entry
      add an entry to the Reduce List "R"

Reducer
  Remove one reduce entry from Reduce List "R"
  Get the current reduction rule "p" from the reduce entry
  Get the current symbol vertex "x" from the reduce entry
  Get the length of the right hand side(RHS) of "p"
  Search Graph-stack to find all symbol vertices "y" which have path to the current symbol vertex "x" which has a length of:
    2*(the length of the RHS of rule "p") −2
  For each symbol vertex "y" found
    Create node
    For each state vertex "w" linked to symbol vertex "y"
      Update tables Create node
  Create a new node "q"
  Create a subnode "r" which contains the nodes from each symbol vertex in the path to the symbol vertex "y"
  If the length of RHS of rule "p" is 1
    Create single node
  Otherwise
    Create multi-node
  Assign symbol attributes from the LHS symbol of rule "p"
  Create subfields Create Single Node
  Copy the text pointers from the single node in the subnode "r"
  Add the subnode "r" to the new node "q"

Create Multi-node
  Get the text start pointer from the first node in the subnode "r"
  Get the text finish pointer from the last node in the subnode "r"
  Add the subnode "K" to the new node "q"

Create Subfields

For each implied subfield in the token variable
　Create a new node
　Assign symbol attributes from the implied subfield
　Create a text string from the implied subfield's text string
　Set the new node's start pointer to the start of this text string
　Set the new node's finish pointer to the end of this text string
Update Tables
　Get the previous state from the state vertex "w" Get the Left Hand Side(LHS) symbol of the current production rule "p"
　Get the symbol_id "N" from this symbol
　Use the previous state and the symbol_id "N" to lookup the Parse Table
　Get the new state "s" from the Parse Table entry
　Search Vertex List U[i] for a state vertex which has the same parse state "s"
　If found
　　If there already exists a path of length 2 (ie a direct path) from this state vertex "u" to the current state vertex "w"
　　　Get the symbol vertex "z" between these state vertices
　　　add the current subnode to this symbol vertex "z" node
　　Otherwise,
　　　Reduce with new symbol vertex
　Otherwise if not found
　　Reduce with all new
Reduce with New Symbol Vertex
　Create new symbol vertex "z"
　Assign the current node to this symbol vertex "z"
　Link the state vertex "w" to the new symbol vertex "z"
　Link the new symbol vertex "z" to the state vertex found with the same parse state "u"
　If this state vertex "u" is not in the Active List "A"
　　Get the new parse state from the state vertex "u"
　　Get the symbol_id from the reduce entry
　　Use the new parse state and the symbol_id to lookup the Parse Table
　　If the Parse Table entry is not empty
　　　For each "reduce" entry in the Parse Table entry
　　　　Add an entry to the Reduce List "R"
Reduce with all New
　Create a new state vertex "u"
　Set the parse state of the state vertex "u" to state "s"
　Create a new symbol vertex "x"
　Assign the current node to the new symbol vertex "z"
　Link the state vertex "w" to the new symbol vertex "x"
　Link the new symbol vertex "x" to the new state vertex "u"
　Add state vertex "u" to Active List "A"
　Add state vertex "u" to Vertex List "U[i]"
Shift Token
　Initialise Vertex List "U[i+1]"
　Sort the Shift List "Q" by symbol_id, then by parse state "s", then by state vertex "v"
　For all entries in the Shift List with the same symbol_id
　　Create a new node from the token and the token variable list
　　For each implied subfield in the dictionary entry
　　　Add new subfield node to the new node as above
　　For each unique parse state "s" within the symbol_id subset
　　　Create a new state vertex "w"
　　　Set the parse state of the state vertex "w" to parse state "s"
　　　Create a new symbol vertex "x"
　　　Assign the new node to the new symbol vertex "x"
　　　Link the new symbol vertex "x" to the new vertex "w"
　　　Add state vertex "w" to Vertex List "U[i+1]"
　　　For each shift entry in the parse state subset
　　　　Get the state vertex "v" from the shift entry
　　　　Link the new symbol vertex "x" to the state vertex "v"
Parse "end of input"
　Create a token with one token variable
　Set the symbol_id to the "End of input" symbol
　Parse Token

What is claimed is:

1. A method of processing free-format data stored in a computing system, comprising the steps of examining elements of the data to determine attributes of the data, by examining the content of the elements and the contextual relationships of elements to each other, to determine semantic and syntactic information about the data, producing additional data relating to this information, in the form of a text object which includes pointer means enabling access to the elements of the free-format data, and the additional data being accessible by a query processing means to provide at least one of answers to queries relating to the semantic and syntactic information about the data and to access the data to manipulate the data; and arranging the text object to act as a layer, between the free-format data and the query processing means, for at least one of interpretation and manipulation of the data processing a plurality of free-format data records and producing a text object associated with each free-format data record; and producing a text object index including attribute type identifiers for elements of each data record and pointers to each data record, whereby the index may be queried by queries relating to semantic and syntactic-information about the data and the data may be accessed via the index.

2. A method in accordance with claim 1, wherein the free-format data is stored as a record in a free-format field of a database.

3. A method in accordance with claim 1, wherein the data remains stored in the computing system as it was originally stored, whereby it may be accessed by other applications.

4. A method in accordance with claim 1, wherein the text object includes an attribute—type identifier which identifies an attribute type of an element of the data.

5. A method in accordance with claim 1, wherein the text object includes a value indicating the character length of an element of the data.

6. A method in accordance with claim 4, wherein the text object includes a value indicating whether an element is low level in a syntactic hierarchy or higher level whereby the value may be used for matching purposes when matching data with other data processed in accordance with the method.

7. A method in accordance with claim 1, the text object including a match weighting value for an element of the data, which can be used to determine the significance of the element when matching with other free format data.

8. A method in accordance with claim 1, wherein the text object comprises a plurality of component nodes arranged according to the semantic structure of the free-format data, the component nodes being arranged in a hierarchy corresponding to the semantic structure of the free-format data and each component node including additional data relating to the corresponding element of the free-format data.

9. A method in accordance with claim 1, comprising the further step of generating matching values for comparing an element of the free-format data with an element of other free-format data processed in accordance with the present method.

10. A method in accordance with claim 9 where the matching value is a phonetic value for phonetically comparing elements of free-format data.

11. A method in accordance with claim 1, wherein the text object includes implied data relating to information implied from the free-format data.

12. A method in accordance with claim 1, wherein a plurality of free-format data records are processed and a text object associated with each free-format data record is produced.

13. A method in accordance with claim 12, wherein the text object is stored in the computer system whereby it is available for queries on the associated free-format data record via the query processing means.

14. A method in accordance with claim 1 wherein each entry in the text object index includes a representative value key, which gives a value representative of a feature of the element associated with the attribute—type identifier.

15. A method in accordance with claim 1, comprising the further step of carrying out a domain construction process to construct a domain object from domain definition data files, the domain object being arranged to carry out the examination process by parsing the free-format data in accordance with grammar rules.

16. A method in accordance with claim 15, wherein the domain definition data files include character definition data, regular expression definition data and grammar data.

17. A method in accordance with claim 1, wherein the free-format data is postal address data.

18. A method in accordance with claim 1 wherein the query processing means can carry out normal database operations on the data via the additional data.

19. A process system for processing free-format data stored in a computing system, the apparatus including means for examining elements of the data to determine attributes of the data, by examining the content of the elements and the contextual relationships of elements to each other, to determine semantic and syntactic information about the data, means for producing additional data relating to this information, in the form of a text object which includes pointer means enabling access to the elements of the free-format data, and a query processing means which is arranged to access the additional data to provide at least one of answers to queries relating to the semantic and syntactic information about the data and access the data to manipulate the data; and arranging the text object to act as a layer, between the free-format data and the query processing means, for at least one of interpretation and manipulation of the data;

arranging the system is arranged to process a plurality of free-format data records and produce a text object associated with each free-format data record; and arranging the means for producing additional data to produce a text object index including attribute-type identifiers for elements of each data record and pointers to each data record and arranging the query processing means to access the text object index to provide answers to queries relating to the semantic and the syntactic information about the data and to access the data to manipulate the data.

20. A processing system in accordance with claim 19, wherein the free-format data is stored as a record in a free-format field of a database.

21. A processing system in accordance with claim 19, wherein the examining means does not affect the storage of the data.

22. A processing system in accordance with claim 20, wherein the text object includes an attribute—type identifier which identifies an attribute type of an element of the data.

23. A processing system in accordance with claim 20, wherein the text object includes a value indicating the character length of an element of the data.

24. A processing system in accordance with claim 22, wherein the text object includes a value, indicating whether an attribute—type of an element is low level in a syntactic hierarchy or high level whereby the value may be used for matching purposes when matching with other free-format data processed in accordance with this system.

25. A processing system in accordance with claim 20, wherein the text object includes a match weighting value for an element of the data, which can be used to determine the significance of the element when matching with other free-format data.

26. A processing system in accordance with claim 20, wherein the text object comprises a plurality of component nodes arranged according to the semantic structure of the free-format data, the component nodes being arranged in a hierarchy corresponding to the semantic structure of the free-format data, and each component node including additional data relating to the corresponding element of free-format data.

27. A processing system in accordance with any one of claims 19 to 26, the text object means for generating matching values for comparing an element of the free-format data with an element of other free-format data processed by the processing system.

28. A processing system in accordance with claim 27, wherein the matching value is a phonetic value for phonetically comparing elements of free-format data.

29. A processing system in accordance with claim 20, wherein the text object includes implied data relating to information implied from the free-format data.

30. A processing system in accordance with claim 20, wherein the system is arranged to process a plurality of free-format data records and produce a text object associated with each free-format data record.

31. A processing system in accordance with claim 30, wherein the text object index includes representative value keys for entries, which give a value representative of a feature of the elements associated with the attribute-type identifier for the entry for facilitating matching with other free-format data process in accordance with the system.

32. A processing system in accordance with claim 20, further comprising a domain object, the domain object being arranged to carry out the examination process by parsing the free-format data in accordance with grammar rules.

33. A processing system in accordance with claim 32, wherein the domain object is produced by a domain construction process from domain definition data files.

34. A processing system in accordance with claim 33, further comprising a domain constructor for carrying out the domain construction process.

35. A processing system in accordance with claim 33, wherein the domain definition data files include character definition data, regular expression definition data and grammar data.

36. A processing system in accordance with claim 20, wherein the free-format data is postal address data.

37. A processing system in accordance with claim 20, wherein the query processing means is arranged to carry out normal database operations on the data via the additional data.

38. A method of enabling access to free-format data stored in a computer system, including a plurality of free-format data records, comprising the steps of storing additional data relating to semantic and syntactic information about the data of each data record, the additional data being in the form of a text object index which includes attribute—type identifiers for elements of each data record and pointers to each data record, the text object index being accessible by a query processing means to provide at least one of answers to queries relating to the semantic and syntactic information about the data and access the data to manipulate the data; and arranging the text object index to act as a layer, between the free-format data and the query processing means, for at least one of interpretation and manipulation of the data.

39. A processing system for enabling access to free-format data stored in a computing system, including a plurality of free-format data records, the processing system comprising the additional data relating to semantic and syntactic information about the free-format data for each data record, the additional data being in the form of a text object index which includes attribute—type identifiers for elements of each data record and pointers to each data record, and a query processing means arranged to access the additional data to provide at least one of answers to queries relating to the semantic and syntactic information about the data and access the data to manipulate the data; and arranging the text object index to act as a layer, between the free-format data and the query processing means, for at least one of interpretation and manipulation of the data.

* * * * *